US012683489B2

(12) United States Patent
Ou et al.

(10) Patent No.: US 12,683,489 B2
(45) Date of Patent: Jul. 14, 2026

(54) RESONANT SWITCHED CAPACITOR CONVERTER AND POWER SUPPLY SYSTEM

(71) Applicant: Huawei Digital Power Technologies Co., Ltd., Shenzhen (CN)

(72) Inventors: Shousong Ou, Dongguan (CN); Haitao Chen, Shenzhen (CN); Xingzhong Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 298 days.

(21) Appl. No.: 18/506,308

(22) Filed: Nov. 10, 2023

(65) Prior Publication Data

US 2024/0079957 A1 Mar. 7, 2024

Related U.S. Application Data

(63) Continuation of application No. PCT/CN2021/093604, filed on May 13, 2021.

(51) Int. Cl.
*H02M 3/07* (2006.01)
*H02M 1/00* (2007.01)
*H02M 3/00* (2006.01)

(52) U.S. Cl.
CPC .............. *H02M 3/07* (2013.01); *H02M 3/01* (2021.05); *H02M 1/0074* (2021.05); *H02M 1/0093* (2021.05)

(58) Field of Classification Search
CPC ............. H02M 1/0074; H02M 1/0093; H02M 1/0095; H02M 3/01; H02M 3/07–078; H02M 3/158; H02M 7/4837
See application file for complete search history.

(56) References Cited

U.S. PATENT DOCUMENTS

| | | | | |
|---|---|---|---|---|
| 10,256,729 B1 * | 4/2019 | Notsch | .................... | H02M 1/14 |
| 12,107,496 B2 * | 10/2024 | Chen | ....................... | H02M 3/01 |
| 12,451,801 B2 * | 10/2025 | Chen | ....................... | H02M 3/07 |

(Continued)

FOREIGN PATENT DOCUMENTS

| | | |
|---|---|---|
| CN | 109698626 A | 4/2019 |
| WO | 2017000532 A1 | 1/2017 |
| WO | 2019019784 A1 | 1/2019 |

OTHER PUBLICATIONS

Machine translation of WO 2017/000532. (Year: 2017).*
Machine tmslation of WO 2019/019784. (Year: 2019).*

*Primary Examiner* — Fred E Finch, III
(74) *Attorney, Agent, or Firm* — Conley Rose, P.C.

(57) ABSTRACT

A resonant switched capacitor converter includes a control system, a first capacitor, a plurality of resonant systems, and a plurality of second capacitors coupled in series. The first capacitor is coupled in series to the second capacitors. One resonant system corresponds to one second capacitor. Each of the resonant systems includes a first switch system, a resonant circuit, and a second switch system. The control system is coupled to the resonant systems and configured to control, based on a target output voltage gain, switches in the first switch system and the second switch system in each resonant system to be turned on or turned off, to enable the resonant switched capacitor converter to obtain an output voltage gain equal to the target output voltage gain.

20 Claims, 14 Drawing Sheets

(56)  References Cited

U.S. PATENT DOCUMENTS

| | | | | |
|---|---|---|---|---|
| 2020/0395845 A1* | 12/2020 | Jain | ........................ | H03K 3/037 |
| 2023/0299669 A1* | 9/2023 | He | ......................... | H02M 3/07 |
| | | | | 363/125 |

* cited by examiner

RESONANT SWITCHED CAPACITOR CONVERTER AND POWER SUPPLY SYSTEM

CROSS-REFERENCE TO RELATED APPLICATIONS

This application is a continuation application of International Patent Application No. PCT/CN2021/093604 filed on May 13, 2021, which is hereby incorporated by reference in its entirety.

TECHNICAL FIELD

This application relates to the field of power technologies, and in particular, to a resonant switched capacitor converter and a power supply system.

BACKGROUND

In the power conversion field, converting a direct current into direct currents at different voltages is a common power conversion requirement. Therefore, various circuit topologies (for example, a resonant switched capacitor direct-current conversion circuit) emerge in the academic research field and the engineering application field to implement a direct-current conversion function.

A resonant switched capacitor direct-current conversion circuit usually implements a direct-current conversion function with a specific output voltage gain in an open-loop control mode, and the output voltage gain of the resonant switched capacitor direct-current conversion circuit depends only on a circuit topology of the resonant switched capacitor direct-current conversion circuit. In the conventional technology, the resonant switched capacitor direct-current conversion circuit may include a plurality of resonant cavities (for example, three resonant cavities), and the resonant cavity mainly includes an energy storage element and a switch device. The switch device is periodically turned on or turned off to cause resonance to the energy storage element, to implement a direct-current conversion function with a specific output voltage gain (for example, 4:1). However, when implementing a direct-current conversion function with another output voltage gain, the resonant switched capacitor direct-current conversion circuit can implement the other output voltage gain only through an increase or a reduction of a quantity of resonant cavities. This changes a hardware circuit topology and has poor applicability.

SUMMARY

This application provides a resonant switched capacitor converter and a power supply system, to flexibly control different output voltage gains of a resonant switched capacitor converter, so that applicability is high.

According to a first aspect, this application provides a resonant switched capacitor converter. The resonant switched capacitor converter may include a control module, a first capacitor, a plurality of resonant modules, and a plurality of second capacitors connected in series. The first capacitor is connected in series to the plurality of second capacitors connected in series. One resonant module may correspond to one second capacitor. The resonant module includes a first switch unit, a resonant unit, and a second switch unit. A first connection end of the first switch unit and a first connection end of the second switch unit may be connected in parallel to two ends of the second capacitor. A second connection end of the first switch unit and a second connection end of the second switch unit may be connected in parallel to two ends of the first capacitor. A third connection end of the first switch unit may be connected to a third connection end of the second switch unit through the resonant unit. The control module may be connected to the resonant modules, and the control module may be configured to control, based on a target output voltage gain, switches in a first switch unit and a second switch unit in each resonant module to be turned on or turned off, so that an output voltage gain of the resonant switched capacitor converter reaches the target output voltage gain. The target output voltage gain herein may be a ratio of an input voltage of the resonant switched capacitor converter to an output voltage of the resonant switched capacitor converter, and the target output voltage gain may be greater than or equal to 1 and less than or equal to a quantity of resonant modules plus 1. The resonant switched capacitor converter may have different target output voltage gains in different application scenarios. In this application, each switch in each resonant module may be controlled to be turned on or turned off to flexibly adjust the output voltage gain of the resonant switched capacitor converter. This avoids changing a hardware circuit topology. Therefore, flexibility and applicability are high.

With reference to the first aspect, in a first possible implementation, the first switch unit includes a first switch and a second switch that are connected in series. Optionally, the first switch unit may further include another device (for example, a switch device). An end of the first switch may serve as the first connection end of the first switch unit, to connect to an end of the second capacitor. Another end of the first switch may be connected to an end of the second switch. Another end of the second switch may serve as the second connection end of the first switch unit, to connect to an end of the first capacitor. A series connection point between the first switch and the second switch may serve as the third connection end of the first switch unit.

With reference to the first possible implementation of the first aspect, in a second possible implementation, the second switch unit includes a third switch and a fourth switch that are connected in series, and the second switch unit may further include another device (for example, a switch device). An end of the third switch may serve as the first connection end of the second switch unit, to connect to another end of the second capacitor. Another end of the third switch may be connected to an end of the fourth switch. Another end of the fourth switch may serve as the second connection end of the second switch unit, to connect to another end of the first capacitor. A series connection point between the third switch and the fourth switch may serve as the third connection end of the second switch unit.

Optionally, the first switch, the second switch, the third switch, or the fourth switch may be an insulated-gate bipolar transistor (IGBT), a metal-oxide-semiconductor field-effect transistor (MOSFET), or a relay. The first switch, the second switch, the third switch, or the fourth switch may be made of a silicon (Si) semiconductor material, a third-generation wide-band-gap semiconductor material such as silicon carbide (SiC), gallium nitride (GaN), diamond, or zinc oxide (ZnO), or another material.

With reference to the second possible implementation of the first aspect, in a third possible implementation, the control module may be configured to generate a drive signal for each switch in each resonant module based on the target output voltage gain, and control, based on the drive signal for each switch, each switch in each resonant module to be turned on or turned off. In the resonant switched capacitor converter provided in this application, each switch in each resonant module may be flexibly controlled to be turned on or turned off based on different drive signals, to implement different target output voltage gains of the resonant switched capacitor converter. Therefore, applicability is higher.

With reference to the second possible implementation of the first aspect or the third possible implementation of the first aspect, in a fourth possible implementation, the resonant switched capacitor converter includes n resonant modules and n second capacitors, where n may be a positive integer greater than 1. The n second capacitors may be connected in series between an input end and an output end of the resonant switched capacitor converter. A second capacitor connected to the input end is a Pt second capacitor. A second capacitor connected to the output end is an $n^{th}$ second capacitor. An $i^{th}$ resonant module of the n resonant modules may be connected in parallel to two ends of an $i^{th}$ second capacitor of the n second capacitors. The control module may be configured to control, based on different target output voltage gains, switches in different resonant modules of the resonant modules to be turned on or turned off, so that an output voltage gain of the resonant switched capacitor converter reaches the different target output voltage gains. In the resonant switched capacitor converter provided in this application, in the case of different target output voltage gains, switches in different resonant modules may be flexibly controlled to be turned on or turned off, to implement different output voltage gains of the resonant switched capacitor converter. Therefore, flexibility and applicability are higher.

With reference to the fourth possible implementation of the first aspect, in a fifth possible implementation, the target output voltage gain may be 1:1, and the control module may be configured to control a first switch and the second switch in a Pt resonant module to be turned on, and control a third switch and a fourth switch in the Pt resonant module to be turned off. In this case, no resonance occurs on a resonant unit in the Pt resonant module. The control module is further configured to control each switch in each of a $2^{nd}$ resonant module to an $n^{th}$ resonant module to be turned off. In this case, the $2^{nd}$ resonant module to the $n^{th}$ resonant module do not operate. In the resonant switched capacitor converter provided in this application, switches in different resonant modules may be flexibly controlled to be turned on or turned off, to implement the target output voltage gain. Therefore, applicability is higher.

With reference to the fourth possible implementation of the first aspect, in a sixth possible implementation, the target output voltage gain is m:1, where m is a positive integer greater than 1 and less than n. The control module may be configured to control a first switch and a third switch in each of a $1^{st}$ resonant module to an $(m-1)^{th}$ resonant module to be turned on, and control a second switch and a fourth switch in the resonant module to be turned off, or control the first switch and the third switch in the resonant module to be turned off, and control the second switch and the fourth switch in the resonant module to be turned on. In this case, resonance occurs on resonant units in the $1^{st}$ resonant module to the $(m-1)^{th}$ resonant module. The control module is further configured to control a first switch and a second switch in an $m^{th}$ resonant module to be turned on, and control a third switch and a fourth switch in the $m^{th}$ resonant module to be turned off. In this case, no resonance occurs on a resonant unit in the $m^{th}$ resonant module. The control module is further configured to control each switch in each of an $(m+1)^{th}$ resonant module to an $n^{th}$ resonant module to be turned off. In this case, the $(m+1)^{th}$ resonant module to the $n^{th}$ resonant module do not operate. In the resonant switched capacitor converter provided in this application, switches in different resonant modules may be flexibly controlled to be turned on or turned off, to implement the target output voltage gain. Therefore, applicability is higher.

With reference to the fourth possible implementation of the first aspect, in a seventh possible implementation, when the target output voltage gain is n:1, the control module may be configured to control a first switch and a third switch in each of a Pt resonant module to an $(n-1)^{th}$ resonant module to be turned on, and control a second switch and a fourth switch in the resonant module to be turned off, or control the first switch and the third switch in the resonant module to be turned off, and control the second switch and the fourth switch in the resonant module to be turned on. In this case, resonance occurs on resonant units in the Pt resonant module to the $(n-1)^{th}$ resonant module. The control module is further configured to control a first switch and a second switch in an $n^{th}$ resonant module to be turned on, and control a third switch and a fourth switch in the $n^{th}$ resonant module to be turned off. In this case, no resonance occurs on a resonant unit in the $n^{th}$ resonant module. In the resonant switched capacitor converter provided in this application, switches in different resonant modules may be flexibly controlled to be turned on or turned off, to implement the target output voltage gain. Therefore, applicability is higher.

With reference to the fourth possible implementation of the first aspect, in an eighth possible implementation, when the target output voltage gain is (n+1):1, the control module may be configured to control a first switch and a third switch in each of the n resonant modules to be turned on, and control a second switch and a fourth switch in the resonant module to be turned off, or control the first switch and the third switch in the resonant module to be turned off, and control the second switch and the fourth switch in the resonant module to be turned on. In this case, resonance occurs on resonant units in the n resonant modules. In the resonant switched capacitor converter provided in this application, switches in different resonant modules may be flexibly controlled to be turned on or turned off, to implement the target output voltage gain. Therefore, applicability is higher.

With reference to any one of the second possible implementation of the first aspect to the eighth possible implementation of the first aspect, in a ninth possible implementation, the resonant unit includes a resonant inductor and a resonant capacitor that are connected in series, and the resonant inductor and the resonant capacitor may constitute a series resonant network. Optionally, the resonant unit may further include another device (for example, a transformer). The series connection point between the first switch and the second switch may be connected to the series connection point between the third switch and the fourth switch through the resonant inductor and the resonant capacitor.

According to a second aspect, this application provides a power supply system. The power supply system includes a power supply module and the resonant switched capacitor converter that is provided in any one of the first aspect to the ninth possible implementation of the first aspect and that is connected to the power supply module.

With reference to the second aspect, in a first possible implementation, in an application scenario of photovoltaic power supply, the power supply module includes at least one photovoltaic array, and the photovoltaic array may include a plurality of photovoltaic panels connected in series.

With reference to the second aspect or the first possible implementation of the second aspect, in a second possible implementation, in an application scenario of pure storage power supply, the power supply module includes at least one energy storage unit, and the energy storage unit includes an energy storage battery or a supercapacitor. Optionally, in an application scenario of hybrid photovoltaic plus storage power supply, the power supply module includes at least one photovoltaic array and at least one energy storage unit.

In this application, each switch in each resonant module may be controlled to be turned on or turned off to flexibly adjust the target output voltage gain of the resonant switched capacitor converter. This avoids changing a hardware circuit topology. Therefore, flexibility and applicability are high.

DESCRIPTION OF EMBODIMENTS

A resonant switched capacitor converter provided in this application is a direct current (DC)/DC converter, is suitable for power supply for a plurality of types of power generation devices such as a photovoltaic power generation device or a wind power generation device and different types of electric devices (such as a power grid, a home device, or an industrial or commercial electric device), may be used in the automotive field and the microgrid field, and is applicable to a direct-current conversion application scenario with a wide input voltage range or a wide output voltage range, for example, different application scenarios such as an application scenario of pure storage power supply, an application scenario of photovoltaic power supply, and an application scenario of hybrid photovoltaic plus storage power supply.

Figure 1:
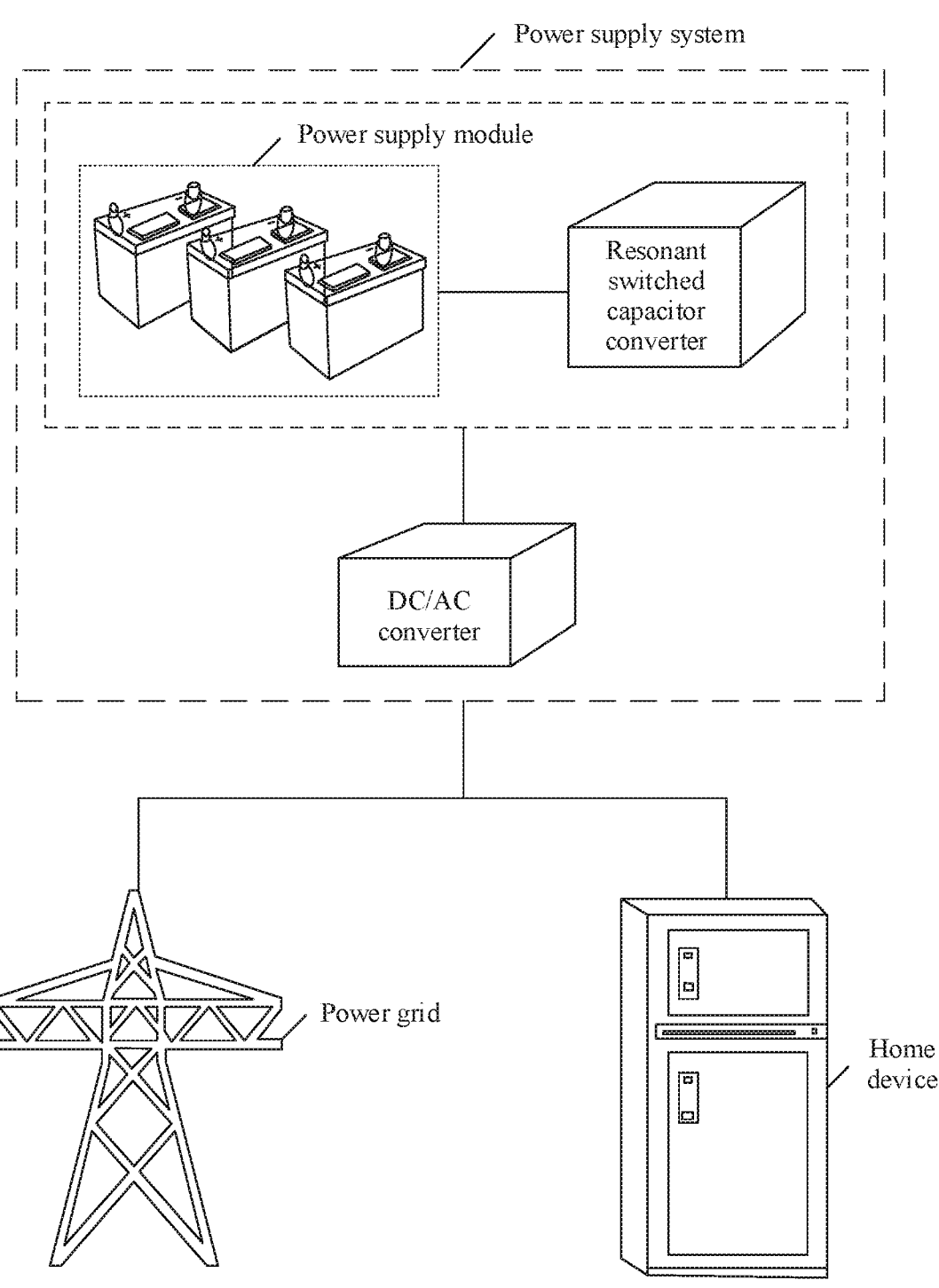
FIG. 1 is a schematic diagram of an application scenario of a resonant switched capacitor converter according to this application.

FIG. 1 is a schematic diagram of an application scenario of a resonant switched capacitor converter according to this application. The resonant switched capacitor converter provided in this application includes a control module, a first capacitor, a plurality of resonant modules, and a plurality of second capacitors connected in series. The control module may be connected to the resonant modules. The first capacitor is connected in series to the plurality of second capacitors connected in series. One resonant module may correspond to one second capacitor. The resonant module includes a first switch unit, a resonant unit, and a second switch unit. A first connection end of the first switch unit and a first connection end of the second switch unit may be connected in parallel to two ends of the second capacitor. A second connection end of the first switch unit and a second connection end of the second switch unit may be connected in parallel to two ends of the first capacitor. A third connection end of the first switch unit may be connected to a third connection end of the second switch unit through the resonant unit. As shown in FIG. 1, a power supply system includes a power supply module and the resonant switched capacitor converter connected to the power supply module, and the power supply system further includes a DC/alternating current (AC) converter. In an application scenario of pure storage power supply, the power supply module includes at least one energy storage unit, and the energy storage unit includes an energy storage battery (for example, a lithium-ion battery or a lead-acid battery) or a supercapacitor (or an electrochemical capacitor). For ease of description, in this application, an energy storage battery is used as an example to describe the power supply system provided in this application. One energy storage unit may include a plurality of battery strings connected in series. The battery string may be a battery pack. One battery pack may include one or more battery cells (a voltage of the battery cell usually ranges from 2.5 volts (V) to 4.2 V) connected in series and in parallel, to form a smallest energy storage and management unit.

As shown in FIG. 1, in a process in which the power supply system supplies power to a power grid or a load (for example, a home device), the at least one energy storage unit in the power supply module may provide a direct-current voltage for the resonant switched capacitor converter. In this case, the control module in the resonant switched capacitor converter may control, based on a target output voltage gain required by the DC/AC converter, switches in a first switch unit and a second switch unit in each resonant module to be turned on or turned off, so that an output voltage gain of the resonant switched capacitor converter reaches the target output voltage gain. It can be understood that the resonant switched capacitor converter may output, to the DC/AC converter based on the direct-current voltage provided by the power supply module, a direct-current voltage required by the DC/AC converter. Herein, a voltage ratio of the direct-current voltage provided by the power supply module to the direct-current voltage required by the DC/AC converter is the target output voltage gain. Further, the DC/AC converter may perform power conversion on an input direct-current voltage of the resonant switched capacitor converter to obtain an alternating-current voltage, and output the alternating-current voltage to the power grid or the home device, so as to supply power to the power grid or the home device.

Optionally, in some feasible implementations, in an application scenario of photovoltaic power supply, the power supply module includes at least one photovoltaic array, and the photovoltaic array may include a plurality of photovoltaic panels connected in series. The photovoltaic panel may also be referred to as a photovoltaic module or a solar panel. In a process in which the power supply system supplies power to a power grid or a load (for example, the home device), the resonant switched capacitor converter may output, to the DC/AC converter based on a direct-current voltage provided by the at least one photovoltaic array, a direct-current voltage required by the DC/AC converter. Herein, a voltage ratio of the direct-current voltage provided by the at least one photovoltaic array and the direct-current voltage required by the DC/AC converter is the target output voltage gain. Further, the DC/AC converter may perform power conversion on an input direct-current voltage of the resonant switched capacitor converter to obtain an alternating-current voltage, so as to supply power to the power grid or the home device. In an application scenario of hybrid photovoltaic plus storage power supply, the power supply module includes at least one photovoltaic array and at least one energy storage unit. In a process in which the power supply system supplies power to a power grid or a load (for example, the home device), the resonant switched capacitor converter may output, to the DC/AC converter based on a direct-current voltage provided by the at least one photovoltaic array and the at least one energy storage unit, a direct-current voltage required by the DC/AC converter. Herein, a voltage ratio of the direct-current voltage provided by the at least one photovoltaic array and the at least one energy storage unit to the direct-current voltage required by the DC/AC converter is the target output voltage gain. Further, the DC/AC converter may perform power conversion on an input direct-current voltage of the resonant switched capacitor converter to obtain an alternating-current voltage, so as to supply power to the power grid or the home device.

The following describes the resonant switched capacitor converter provided in this application and an operating principle of the resonant switched capacitor converter by using examples with reference to FIG. 2 to FIG. 14.

Figure 2:
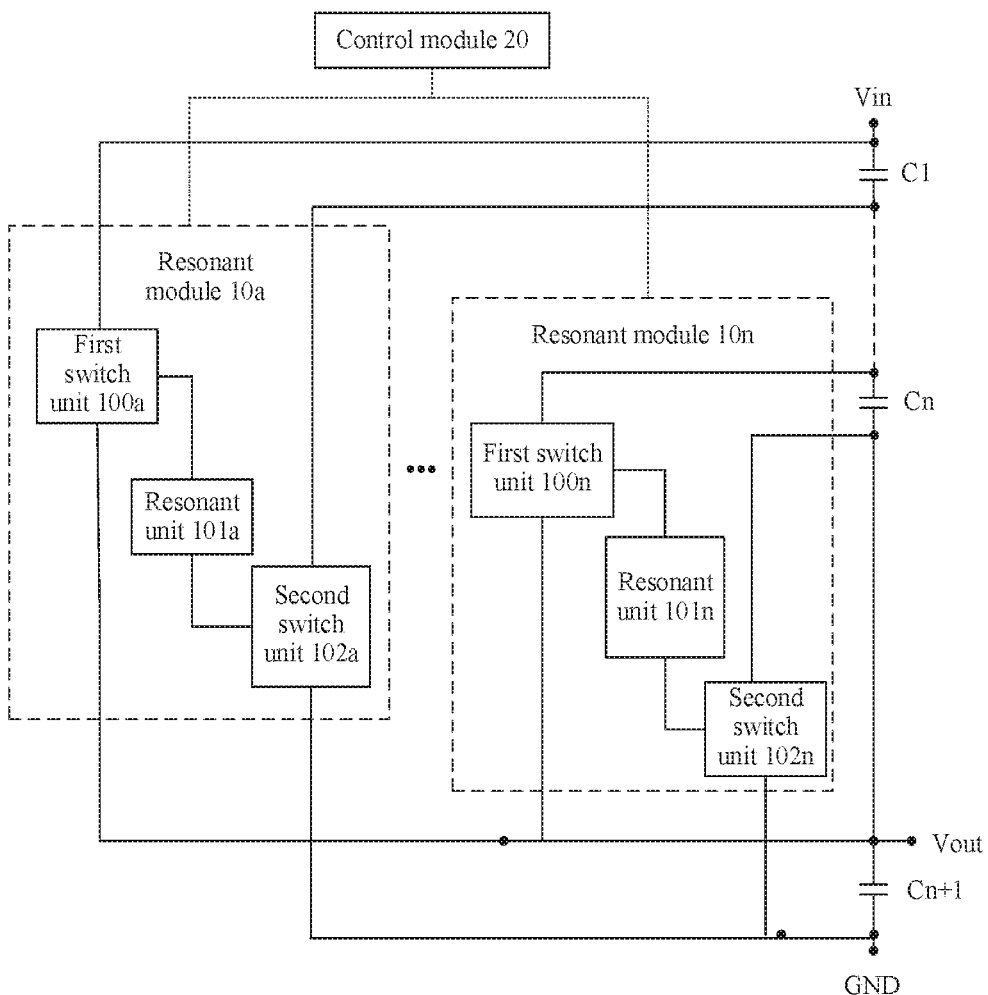
FIG. 2 is a schematic diagram of a structure of a resonant switched capacitor converter according to this application.

FIG. 2 is a schematic diagram of a structure of a resonant switched capacitor converter according to this application. As shown in FIG. 2, the resonant switched capacitor converter may include a plurality of resonant modules (for example, a resonant module $10a$ to a resonant module $10n$), a control module 20, a first capacitor (for example, a first capacitor Cn+1), and a plurality of second capacitors (for example, a second capacitor C1 to a second capacitor Cn) that are connected in series. The first capacitor Cn+1 is connected in series to the second capacitor C1 to the second capacitor Cn that are connected in series. A voltage between the second capacitor C1 and the second capacitor Cn and a voltage at two ends of the first capacitor Cn+1 are input voltages (which may be denoted as Vin) of the resonant switched capacitor converter, and the voltage at the two ends of the first capacitor Cn+1 is also an output voltage (which may be denoted as Vout) of the resonant switched capacitor converter. One of the resonant module $10a$ to the resonant module $10n$ may correspond to one of the second capacitor C1 to the second capacitor Cn. For example, an input end of the resonant module $10a$ may be connected in parallel to the second capacitor C1, and an output end of the resonant module $10a$ may be connected in parallel to the first capacitor Cn+1; . . . , and an input end of the resonant module $10n$ may be connected in parallel to the second capacitor Cn, and an output end of the resonant module $10n$ may be connected in parallel to the first capacitor Cn+1.

In some feasible implementations, one of the resonant module $10a$ to the resonant module $10n$ may include a first switch unit, a resonant unit, and a second switch unit. A first connection end of the first switch unit and a first connection end of the second switch unit may be connected in parallel to two ends of the second capacitor. A second connection end of the first switch unit and a second connection end of the second switch unit may be connected in parallel to two ends of the first capacitor. A third connection end of the first switch unit may be connected to a third connection end of the second switch unit through the resonant unit. Herein, the second connection end of the first switch unit and the second connection end of the second switch unit may be connected to a ground (GND). It can be understood that the resonant module may include two input ends (for example, a first input end and a second input end) and two output ends (for example, a first output end and a second output end). The first connection end of the first switch unit may be understood as the first input end of the resonant module, the first connection end of the second switch unit may be understood as the second input end of the resonant module, the second connection end of the first switch unit may be understood as the first output end of the resonant module, and the second connection end of the second switch unit may be understood as the second output end of the resonant module.

For ease of description, the resonant module $10a$ to the resonant module $10n$ are used below as examples for description. The resonant module $10a$ includes a first switch unit $100a$, a resonant unit $101a$, and a second switch unit $102a$. A first connection end of the first switch unit $100a$ and a first connection end of the second switch unit $102a$ may be connected in parallel to two ends of the second capacitor C1. In other words, a first input end and a second input end of the resonant module $10a$ may be connected in parallel to the two ends of the second capacitor C1. A second connection end of the first switch unit $100a$ and a second connection end of the second switch unit $102a$ may be connected in parallel to two ends of the first capacitor Cn+1. In other words, a first output end and a second output end of the resonant module $10a$ may be connected in parallel to the two ends of the first capacitor Cn+1. A third connection end of the first switch unit $100a$ may be connected to a third connection end of the second switch unit $102a$ through the resonant unit $101a$. By analogy, the resonant module $10n$ includes a first switch unit $100n$, a resonant unit $101n$, and a second switch unit $102n$. A first connection end of the first switch unit $100n$ and a first connection end of the second switch unit $102n$ may be connected in parallel to two ends of the second capacitor Cn. In other words, a first input end and a second input end of the resonant module $10n$ may be connected in parallel to the two ends of the second capacitor Cn. A second connection end of the first switch unit $100n$ and a second connection end of the second switch unit $102n$ may be connected in parallel to two ends of the first capacitor Cn+1. In other words, a first output end and a second output end of the resonant module $10n$ may be connected in parallel to the two ends of the first capacitor Cn+1. A third connection end of the first switch unit $100n$ may be connected to a third connection end of the second switch unit $102n$ through the resonant unit $101n$.

In some feasible implementations, the control module 20 may be connected to each of the resonant module $10a$ to the resonant module $10n$. For example, the control module 20 may be connected to switches in a first switch unit and a second switch unit in each resonant module, to control each switch in each resonant module to be turned on or turned off. The control module 20 may control, based on the target output voltage gain, switches in a first switch unit and a second switch unit in each of the resonant module 10*a* to the resonant module 10*n* to be turned on or turned off, so that an output voltage gain of the resonant switched capacitor converter reaches the target output voltage gain. The target output voltage gain may be determined based on output voltage gains required by the resonant switched capacitor converter in different application scenarios. The resonant switched capacitor converter may have a same target output voltage gain or different target output voltage gains in different application scenarios. This may be determined based on an application scenario, and is not limited herein. The target output voltage gain herein may be a voltage ratio of the input voltage Vin of the resonant switched capacitor converter to the output voltage Vout of the resonant switched capacitor converter, and the target output voltage gain is greater than or equal to 1 and less than or equal to n+1. Herein, n may represent a quantity of resonant modules.

In some feasible implementations, the first switch unit (for example, the first switch unit 100*a* to the first switch unit 100*n*) includes a first switch and a second switch that are connected in series. The first switch and the second switch herein may constitute a switch bridge arm. In addition, the first switch may be understood as an upper bridge arm switch, and the second switch may be understood as a lower bridge arm switch. An end of the first switch may serve as the first connection end of the first switch unit, to connect to an end of the second capacitor. Another end of the first switch may be connected to an end of the second switch. Another end of the second switch may serve as the second connection end of the first switch unit, to connect to an end of the first capacitor. A series connection point between the first switch and the second switch may serve as the third connection end of the first switch unit.

Figure 3:
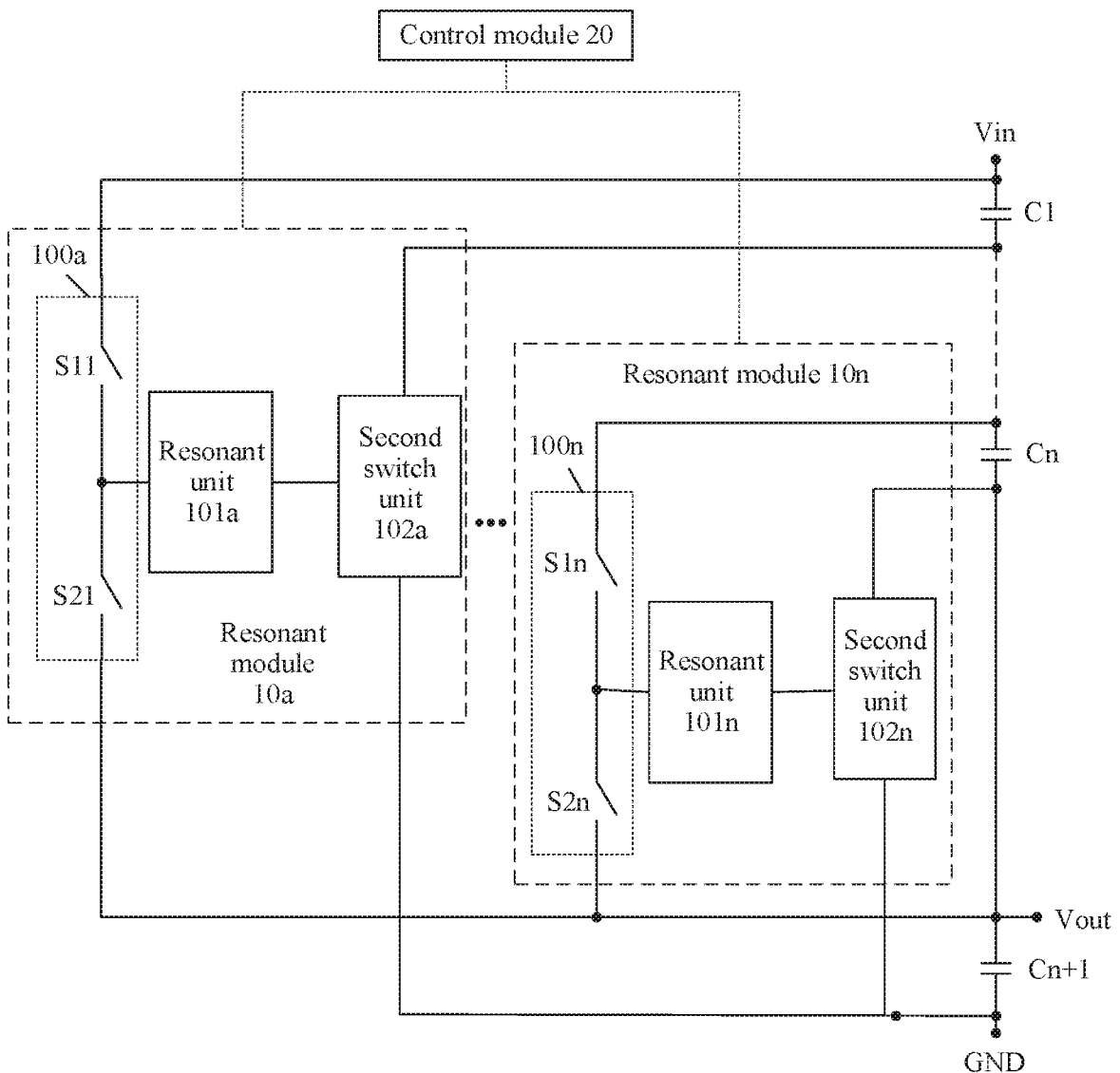
FIG. 3 is another schematic diagram of a structure of a resonant switched capacitor converter according to this application.

FIG. 3 is a schematic diagram of another structure of a resonant switched capacitor converter according to this application. As shown in FIG. 3, the first switch unit 100*a* shown in FIG. 2 may include a first switch S11 and a second switch S21 that are connected in series. An end of the first switch S11 may serve as the first connection end of the first switch unit 100*a*, to connect to an end of the second capacitor C1. Another end of the first switch S11 may be connected to an end of the second switch S21. Another end of the second switch S21 may serve as the second connection end of the first switch unit 100*a*, to connect to an end of the first capacitor Cn+1. A series connection point between the first switch S11 and the second switch S21 may serve as the third connection end of the first switch unit 100*a*. By analogy, the first switch unit 100*n* shown in FIG. 2 may include a first switch S In and a second switch S2*n* that are connected in series. An end of the first switch S In may serve as the first connection end of the first switch unit 100*n*, to connect to an end of the second capacitor Cn. Another end of the first switch S1*n* may be connected to an end of the second switch S2*n*. Another end of the second switch S2*n* may serve as the second connection end of the first switch unit 100*n*, to connect to an end of the first capacitor Cn+1. A series connection point between the first switch S1*n* and the second switch S2*n* may serve as the third connection end of the first switch unit 100*n*.

In some feasible implementations, the second switch unit (for example, the second switch unit 102*a* to the second switch unit 102*n*) includes a third switch and a fourth switch that are connected in series. The third switch and the fourth switch herein may constitute a switch bridge arm. In addition, the third switch may be understood as an upper bridge arm switch, and the fourth switch may be understood as a lower bridge arm switch. An end of the third switch may serve as the first connection end of the second switch unit, to connect to another end of the second capacitor. Another end of the third switch may be connected to an end of the fourth switch. Another end of the fourth switch may serve as the second connection end of the second switch unit, to connect to another end of the first capacitor. A series connection point between the third switch and the fourth switch may serve as the third connection end of the second switch unit.

Figure 4:
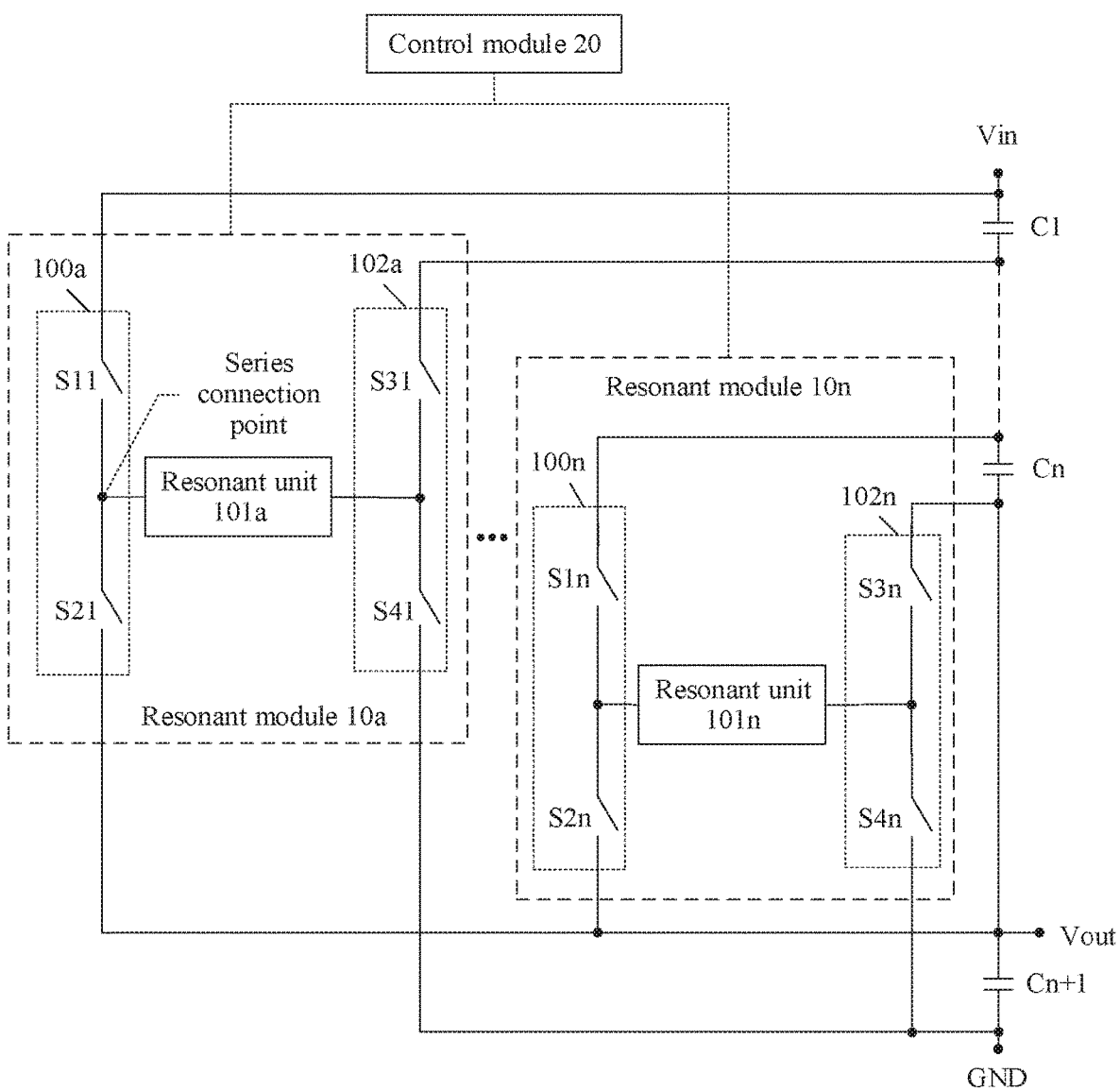
FIG. 4 is a schematic diagram of another structure of a resonant switched capacitor converter according to this application.

FIG. 4 is a schematic diagram of another structure of a resonant switched capacitor converter according to this application. As shown in FIG. 4, the second switch unit 102*a* shown in FIG. 3 may include a third switch S31 and a fourth switch S41 that are connected in series. An end of the third switch S31 may serve as the first connection end of the second switch unit 102*a*, to connect to another end of the second capacitor C1. Another end of the third switch S31 may be connected to an end of the fourth switch S41. Another end of the fourth switch S41 may serve as the second connection end of the second switch unit 102*a*, to connect to another end of the first capacitor Cn+1. A series connection point between the third switch S31 and the fourth switch S41 may serve as the third connection end of the second switch unit 102*a*. By analogy, the second switch unit 102*n* shown in FIG. 3 includes a third switch S3*n* and a fourth switch S4*n* that are connected in series. An end of the third switch S3*n* may serve as the first connection end of the second switch unit 102*n*, to connect to another end of the second capacitor Cn. Another end of the third switch S3*n* may be connected to an end of the fourth switch S4*n*. Another end of the fourth switch S4*n* may serve as the second connection end of the second switch unit 102*n*, to connect to another end of the first capacitor Cn+1. A series connection point between the third switch S3*n* and the fourth switch S4*n* may serve as the third connection end of the second switch unit 102*n*.

In some feasible implementations, the first switch (for example, the first switch S11 to the first switch S1*n*), the second switch (for example, the second switch S21 to the second switch S2*n*), the third switch (for example, the third switch S31 to the third switch S3*n*), and the fourth switch (for example, the fourth switch S41 to the fourth switch S4*n*) may be a MOSFET, an IGBT, or a relay made of a silicon (Si) semiconductor material, a third-generation wide-bandgap semiconductor material such as silicon carbide (SiC), gallium nitride (GaN), diamond, or zinc oxide (ZnO), or another material. This may be determined based on an actual application scenario, and is not limited herein. When the first switch to the fourth switch are MOSFETs, the control module 20 may be connected to a gate of each of the first switch S11 to the first switch S1*n*, the second switch S21 to the second switch S2*n*, the third switch S31 to the third switch S3*n*, and the fourth switch S41 to the fourth switch S4*n*, to control the switch to be turned on or turned off. When the first switch to the fourth switch are IGBTs, the control module 20 may be connected to a base of each switch to control the switch to be turned on or turned off. When the first switch to the fourth switch are relays, the control module 20 may be connected to a coil in each switch to control the switch to be turned on or turned off.

Figure 5:
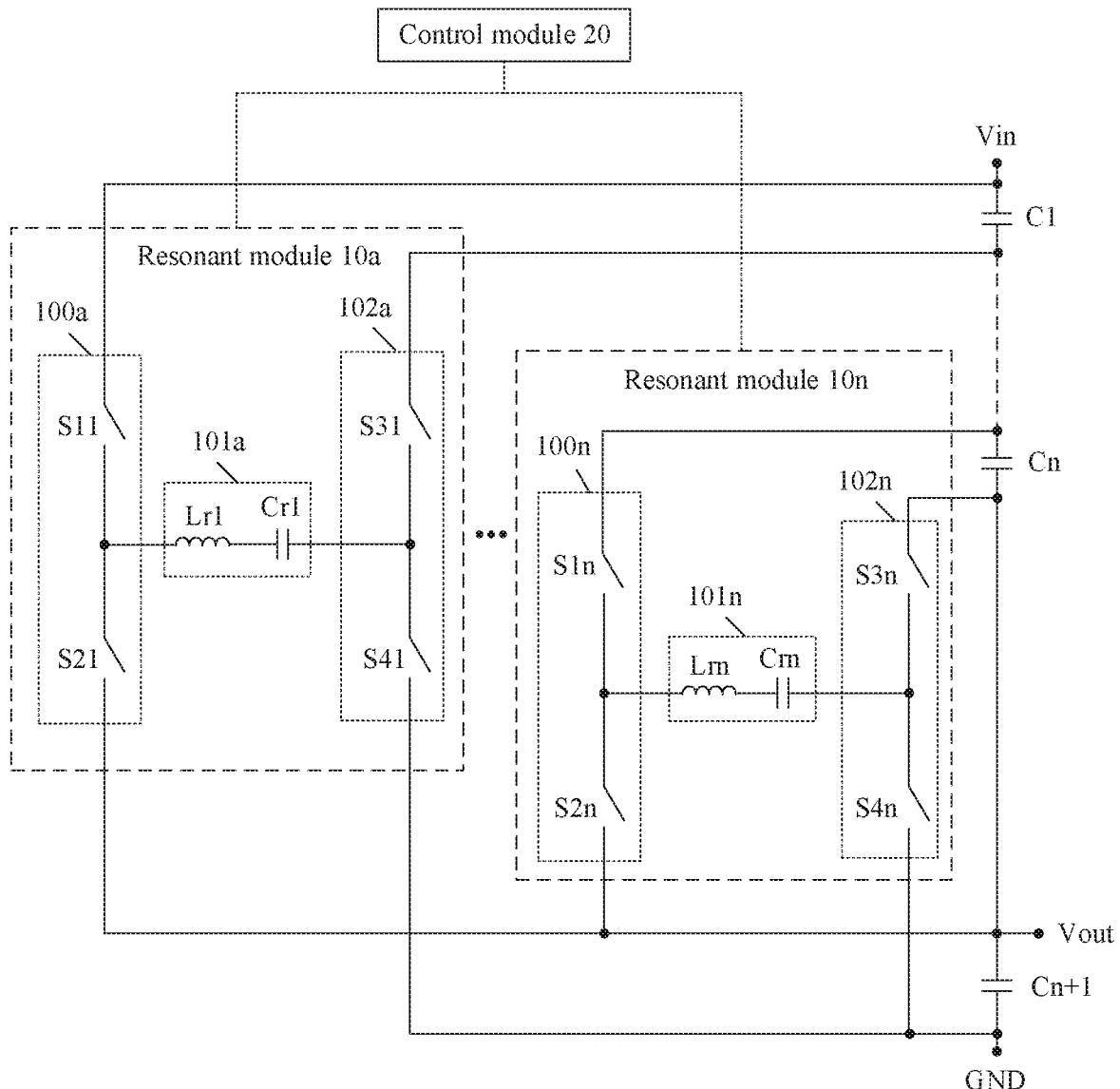
FIG. 5 is a schematic diagram of another structure of a resonant switched capacitor converter according to this application.

In some feasible implementations, the resonant unit (for example, the resonant unit 101*a* to the resonant unit 101*n*)

includes a resonant inductor and a resonant capacitor that are connected in series, and the series connection point between the first switch and the second switch may be connected to the series connection point between the third switch and the fourth switch through the resonant inductor and the resonant capacitor. FIG. 5 is a schematic diagram of another structure of a resonant switched capacitor converter according to this application. As shown in FIG. 5, the resonant unit 101*a* shown in FIG. 4 includes a resonant inductor Lr1 and a resonant capacitor Cr1 that are connected in series, and the series connection point between the first switch S11 and the second switch S21 may be connected to the series connection point between the third switch S31 and the fourth switch S41 through the resonant inductor Lr1 and the resonant capacitor Cr1. The first switch S11, the second switch S21, the third switch S31, the fourth switch S41, the resonant inductor Lr1, and the resonant capacitor Cr1 may constitute a bridge resonant circuit (which may also be referred to as a bridge resonant cavity). By analogy, the resonant unit 101*n* shown in FIG. 4 includes a resonant inductor Lrn and a resonant capacitor Cm that are connected in series, and the series connection point between the first switch S In and the second switch S2*n* may be connected to the series connection point between the third switch S3*n* and the fourth switch S4*n* through the resonant inductor Lrn and the resonant capacitor Crn. The first switch S1*n*, the second switch S2*n*, the third switch S3*n*, the fourth switch S4*n*, the resonant inductor Lrn, and the resonant capacitor Cm may constitute a bridge resonant circuit.

In some feasible implementations, the control module 20 may generate, based on the target output voltage gain, a drive signal (which may also be referred to as a control signal) for each switch in each of the resonant module 10*a* to the resonant module 10*n*, and control, based on the drive signal for each switch, each switch in each of the resonant module 10*a* to the resonant module 10*n* to be turned on or turned off, so that an output voltage gain of the resonant switched capacitor converter reaches the target output voltage gain. A switching frequency of each switch in each resonant module herein may be a resonance frequency (which may also be referred to as a natural frequency) of each resonant module. The resonance frequency may be $$1/(2\pi\sqrt{L_r C_r}),$$

where $L_r$ may indicate an inductive reactance value of a resonant inductor in the resonant module, and $C_r$ may indicate a capacitance capacity value of a resonant capacitor in the resonant module. For example, the drive signal may be a pulse width modulation (pulse width modulation, PWM) signal, which may be referred to as a PWM signal, for each switch in each resonant module. In addition, 1 in the PWM signal indicates that the switch is to be turned on, and 0 in the PWM signal indicates that the switch is to be turned off.

In some feasible implementations, the resonant switched capacitor converter includes n resonant modules (for example, the resonant module 10*a* to the resonant module 10*n*) and n second capacitors (for example, the second capacitor C1 to the second capacitor Cn), where n may be a positive integer greater than 1. The second capacitor C1 to the second capacitor Cn may be connected in series between an input end and an output end of the resonant switched capacitor converter. A second capacitor connected to the input end (for example, the first input end) is a 1$^{st}$ second capacitor (namely, the second capacitor C1). A second capacitor connected to the output end (for example, the first output end) is an n$^{th}$ second capacitor (namely, the second capacitor Cn). An i$^{th}$ resonant module of the resonant module 10*a* to the resonant module 10*n* may be connected in parallel to two ends of an i$^{th}$ second capacitor of the second capacitor C1 to the second capacitor Cn. For example, the resonant module 10*a* (namely, a 1$^{st}$ resonant module) may be connected in parallel to two ends of the second capacitor C1 (namely, the Pt second capacitor), . . . , and the resonant module 10*n* (namely, an n$^{th}$ resonant module) may be connected in parallel to two ends of the second capacitor Cn (namely, the n$^{th}$ second capacitor). The control module 20 may control, based on different target output voltage gains, switches in different resonant modules of the resonant module 10*a* to the resonant module 10*n* to be turned on or turned off, so that an output voltage gain of the resonant switched capacitor converter reaches the different target output voltage gains. Therefore, flexibility and applicability are higher.

In some feasible implementations, when the target output voltage gain is 1:1, the control module 20 may control a first switch and a second switch in the 1$^{st}$ resonant module (for example, the resonant module 10*a*) to be turned on, and control a third switch and a fourth switch in the 1$^{st}$ resonant module to be turned off. In this case, no resonance occurs on the resonant unit 101*a* in the resonant module 10*a*. The control module 20 may further control each switch in each of a 2$^{nd}$ resonant module to the n$^{th}$ resonant module (for example, a resonant module 10*b* to the resonant module 10*n*) to be turned off. In this case, the resonant module 10*b* to the resonant module 10*n* do not operate, so that an output voltage gain of the resonant switched capacitor converter can reach 1:1.

Figure 6:
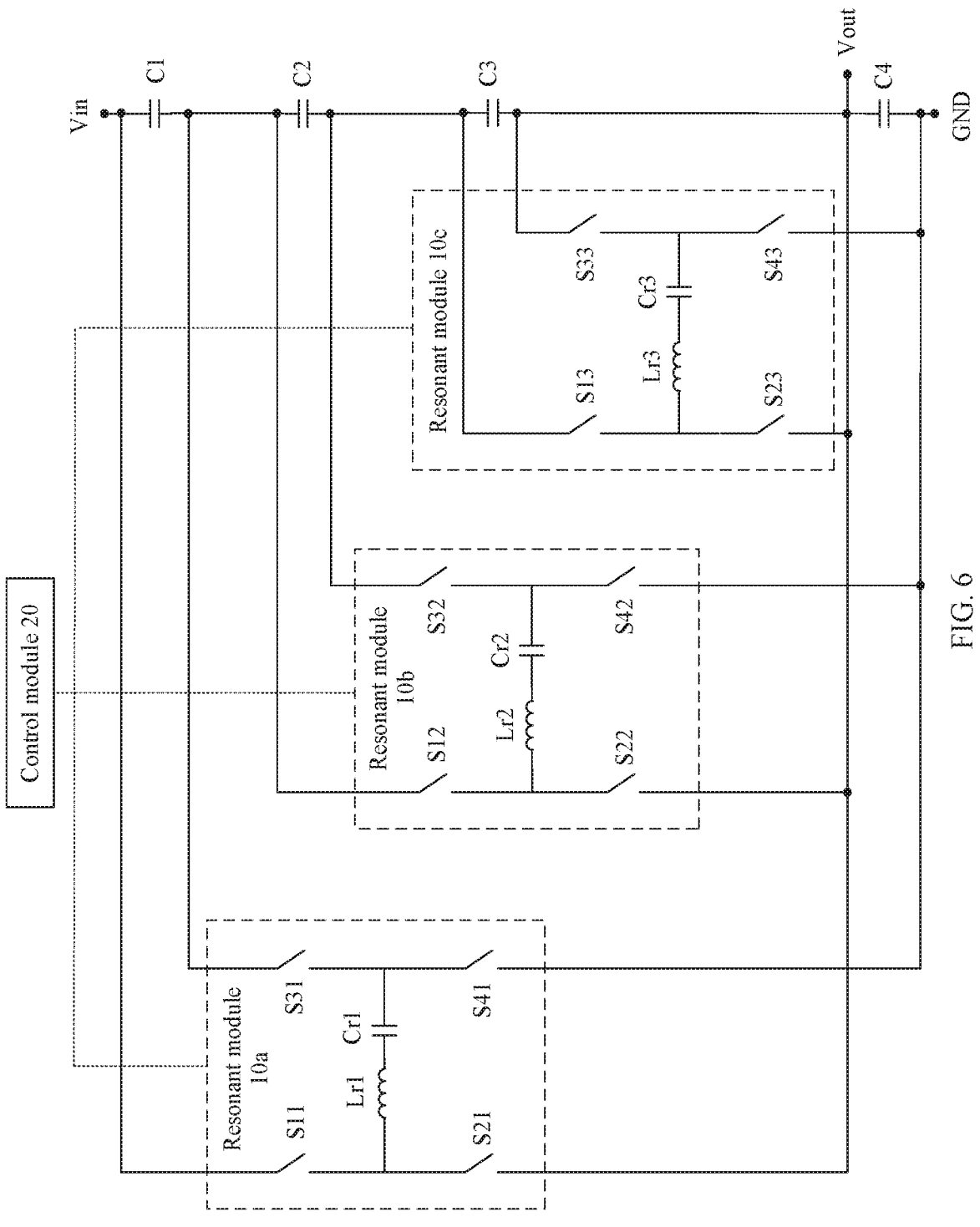
FIG. 6 is a schematic diagram of still another structure of a resonant switched capacitor converter according to this application.

For ease of description, an example in which the resonant switched capacitor converter includes three resonant modules (that is, n is equal to 3) is used below for description. FIG. 6 is a schematic diagram of still another structure of a resonant switched capacitor converter according to this application. As shown in FIG. 6, the resonant switched capacitor converter includes a resonant module 10*a*, a resonant module 10*b*, a resonant module 10*c*, a control module 20, a first capacitor C4, and a second capacitor C1 to a second capacitor C3 that are connected in series. The control module 20 may be connected to the resonant module 10*a* to the resonant module 10*c*. The first capacitor C4 is connected in series to the second capacitor C1 to the second capacitor C3 that are connected in series. The resonant module 10*a* includes a first switch S11, a second switch S21, a third switch S31, a fourth switch S41, a resonant inductor Lr1, and a resonant capacitor Cr1. An end of the first switch S11 and an end of the third switch S31 may be connected in parallel to two ends of the second capacitor C1. Another end of the second switch S21 and another end of the fourth switch S41 may be connected in parallel to two ends of the first capacitor C4. A series connection point between the first switch S11 and the second switch S21 may be connected to a series connection point between the third switch S31 and the fourth switch S41 through the resonant inductor Lr1 and the resonant capacitor Cr1. The resonant module 10*b* includes a first switch S12, a second switch S22, a third switch S32, a fourth switch S42, a resonant inductor Lr2, and a resonant capacitor Cr2. An end of the first switch S12 and an end of the third switch S32 may be connected in parallel to two ends of the second capacitor C2. Another end of the second switch S22 and another end of the fourth switch S42 may be connected in parallel to two ends of the first capacitor C4. A series connection point between the first switch S12 and the second switch S22 may be connected to a series connection point between the third switch S32 and the fourth switch S42 through the resonant inductor Lr2 and the resonant capacitor Cr2. The resonant module 10c includes a first switch S13, a second switch S23, a third switch S33, a fourth switch S43, a resonant inductor Lr3, and a resonant capacitor Cr3. An end of the first switch S13 and an end of the third switch S33 may be connected in parallel to two ends of the second capacitor C3. Another end of the second switch S23 and another end of the fourth switch S43 may be connected in parallel to two ends of the first capacitor C4. A series connection point between the first switch S13 and the second switch S23 may be connected to a series connection point between the third switch S33 and the fourth switch S43 through the resonant inductor Lr3 and the resonant capacitor Cr3.

Figure 7:
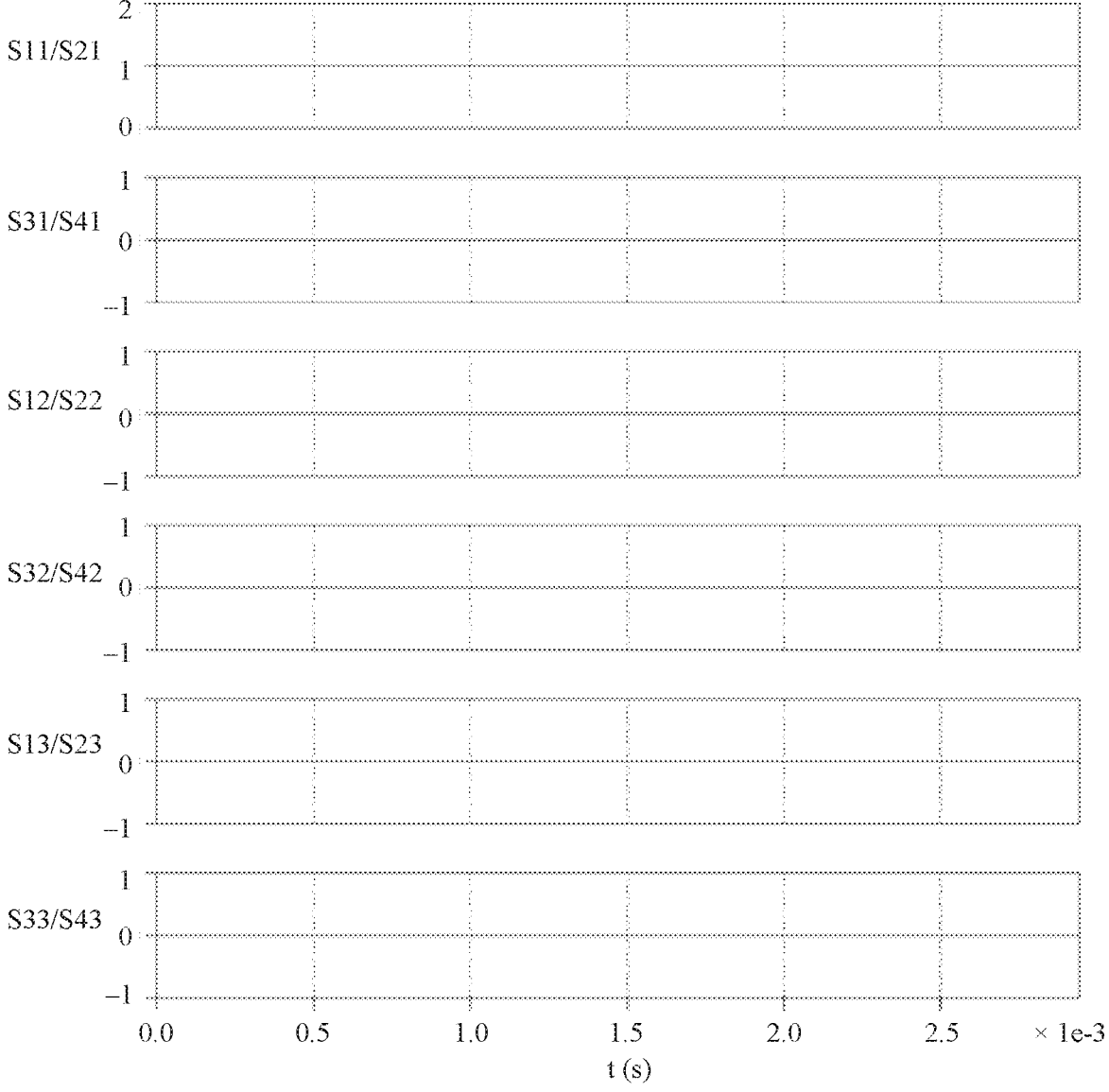
FIG. 7 is a schematic diagram of waveforms of drive signals for switches in resonant modules according to this application.
Figure 8:
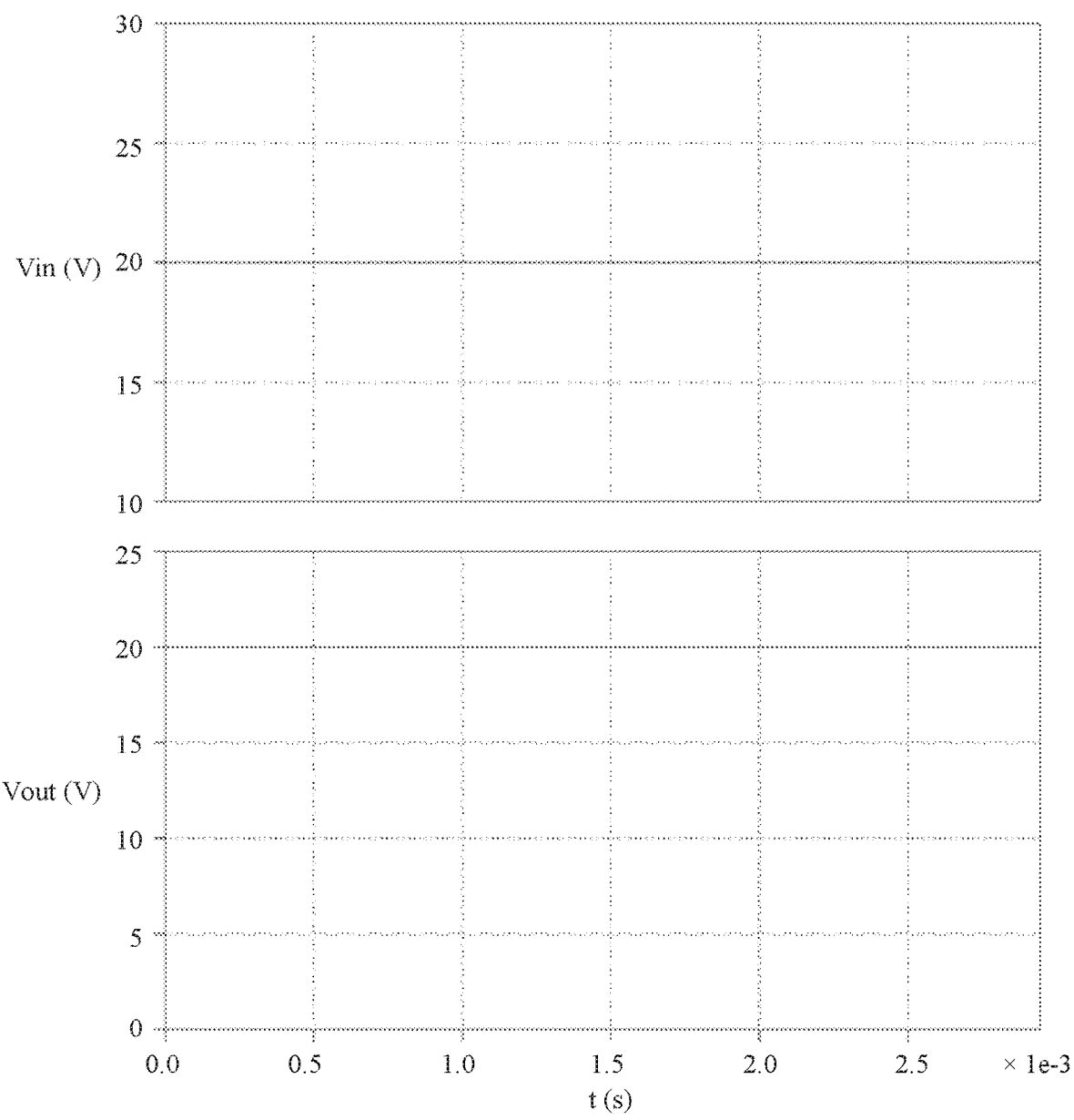
FIG. 8 is a schematic diagram of waveforms of input and output voltages of a resonant switched capacitor converter according to this application.

FIG. 7 is a schematic diagram of waveforms of drive signals for switches in resonant modules according to this application. For ease of description, the resonant module 10a to the resonant module 10c are used below as examples for description. As shown in FIG. 7, when the target output voltage gain is 1:1, the control module 20 may generate a drive signal for each of the first switch S11 to the fourth switch S41 in the resonant module 10a, the first switch S12 to the fourth switch S42 in the resonant module 10b, and the first switch S13 to the fourth switch S43 in the resonant module 10c. Drive signals for the first switch S11 and the second switch S21 are 1 (indicating that the switches are normally on), drive signals for the third switch S31 and the fourth switch S41 are 0 (indicating that the switches are normally off), and a switching frequency of each of the first switch S11 to the fourth switch S41 is approximately a resonance frequency of the resonant module 10a. A drive signal for each of the first switch S12, the second switch S22, the third switch S32, and the fourth switch S42 is 0, and a drive signal for each of the first switch S13, the second switch S23, the third switch S33, and the fourth switch S43 is 0. Further, the control module 20 may control, based on a drive signal for each of the first switch S11 to the fourth switch S41, the first switch S11 and the second switch S21 to be turned on and the third switch S31 and the fourth switch S41 to be turned off. The control module 20 may further control, based on a drive signal (that is, 0) for each of the first switch S12 to the fourth switch S42, each of the first switch S12 to the fourth switch S42 to be turned off, and control, based on a drive signal (that is, 0) for each of the first switch S13 to the fourth switch S43, each of the first switch S13 to the fourth switch S43 to be turned off. In this case, an output voltage gain of the resonant switched capacitor converter may reach 1:1. FIG. 8 is a schematic diagram of waveforms of input and output voltages of a resonant switched capacitor converter according to this application. As shown in FIG. 8, it is assumed that the input voltage Vin of the resonant switched capacitor converter is a target voltage value (for example, 20 V or another voltage value). When the target output voltage gain is 1:1, the control module 20 may control, based on drive signals (for example, the drive signals shown in FIG. 7) for switches in the resonant module 10a to the resonant module 10c, switches in different resonant modules to be turned on or turned off, so that an output voltage gain of the resonant switched capacitor converter reaches 1:1. In this case, the voltage ratio of the input voltage Vin of the resonant switched capacitor converter to the output voltage Vout of the resonant switched capacitor converter is 1:1. Therefore, the output voltage Vout of the resonant switched capacitor converter is 20 V (that is, 20 V/1).

In some feasible implementations, when the target output voltage gain is m:1 and m is a positive integer greater than 1 and less than n, the control module 20 may control a first switch and a third switch in each of the $1^{st}$ resonant module to an $(m-1)^{th}$ resonant module (for example, the resonant module 10a to a resonant module 10m−1) to be turned on, and control a second switch and a fourth switch in the resonant module to be turned off, or control the first switch and the third switch in the resonant module to be turned off, and control the second switch and the fourth switch in the resonant module to be turned on. In this case, resonance occurs on resonant units (for example, the resonant unit 101a to a resonant unit 101m−1) in the resonant module 10a to the resonant module 10m−1. The control module 20 may control a first switch and a second switch in an $m^{th}$ resonant module (for example, a resonant module 10m) to be turned on, and control a third switch and a fourth switch in the $m^{th}$ resonant module to be turned off. In this case, no resonance occurs on a resonant unit (for example, a resonant unit 101m) in the resonant module 10m. The control module 20 may further control each switch in each of an $(m+1)^{th}$ resonant module to the $n^{th}$ resonant module (for example, a resonant module 10m+1 to the resonant module 10n) to be turned off. In this case, the resonant module 10m+1 to the resonant module 10n do not operate, so that an output voltage gain of the resonant switched capacitor converter can reach m:1.

Figure 9:
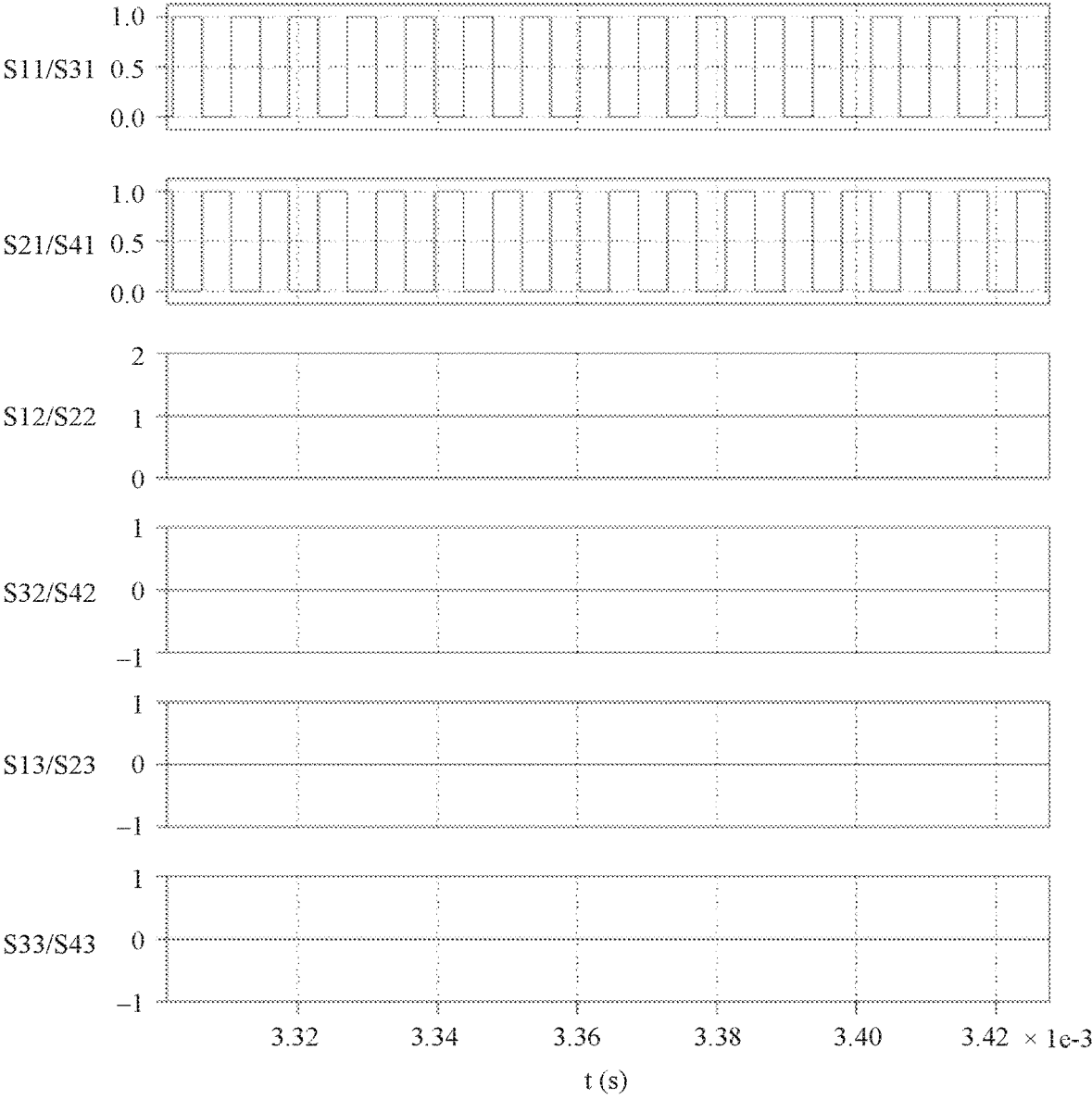
FIG. 9 is another schematic diagram of waveforms of drive signals for switches in resonant modules according to this application.

FIG. 9 is another schematic diagram of waveforms of drive signals for switches in resonant modules according to this application. For ease of description, the resonant module 10a to the resonant module 10c are used below as examples for description. As shown in FIG. 9, when the target output voltage gain is m:1 (for example, 2:1), the control module 20 may generate a drive signal for each of the first switch S11 to the fourth switch S41, the first switch S12 to the fourth switch S42, and the first switch S13 to the fourth switch S43. Drive signals for the first switch S11 and the third switch S31 are square waves with a switch duty cycle of 50%, and drive signals for the second switch S21 and the fourth switch S41 are complementary to the drive signals for the first switch S11 and the third switch S31. In other words, when the drive signals for the first switch S11 and the third switch S31 are 1 (or 0), the drive signals for the second switch S21 and the fourth switch S41 are 0 (or 1). In addition, a switching frequency of each of the first switch S11 to the fourth switch S41 is approximately a resonance frequency of the resonant module 10a. Drive signals for the first switch S12 and the second switch S22 are 1, drive signals for the third switch S32 and the fourth switch S42 are 0, and a switching frequency of each of the first switch S12 to the fourth switch S42 is approximately a resonance frequency of the resonant module 10b. A drive signal for each of the first switch S13, the second switch S23, the third switch S33, and the fourth switch S43 is 0.

Figure 10:
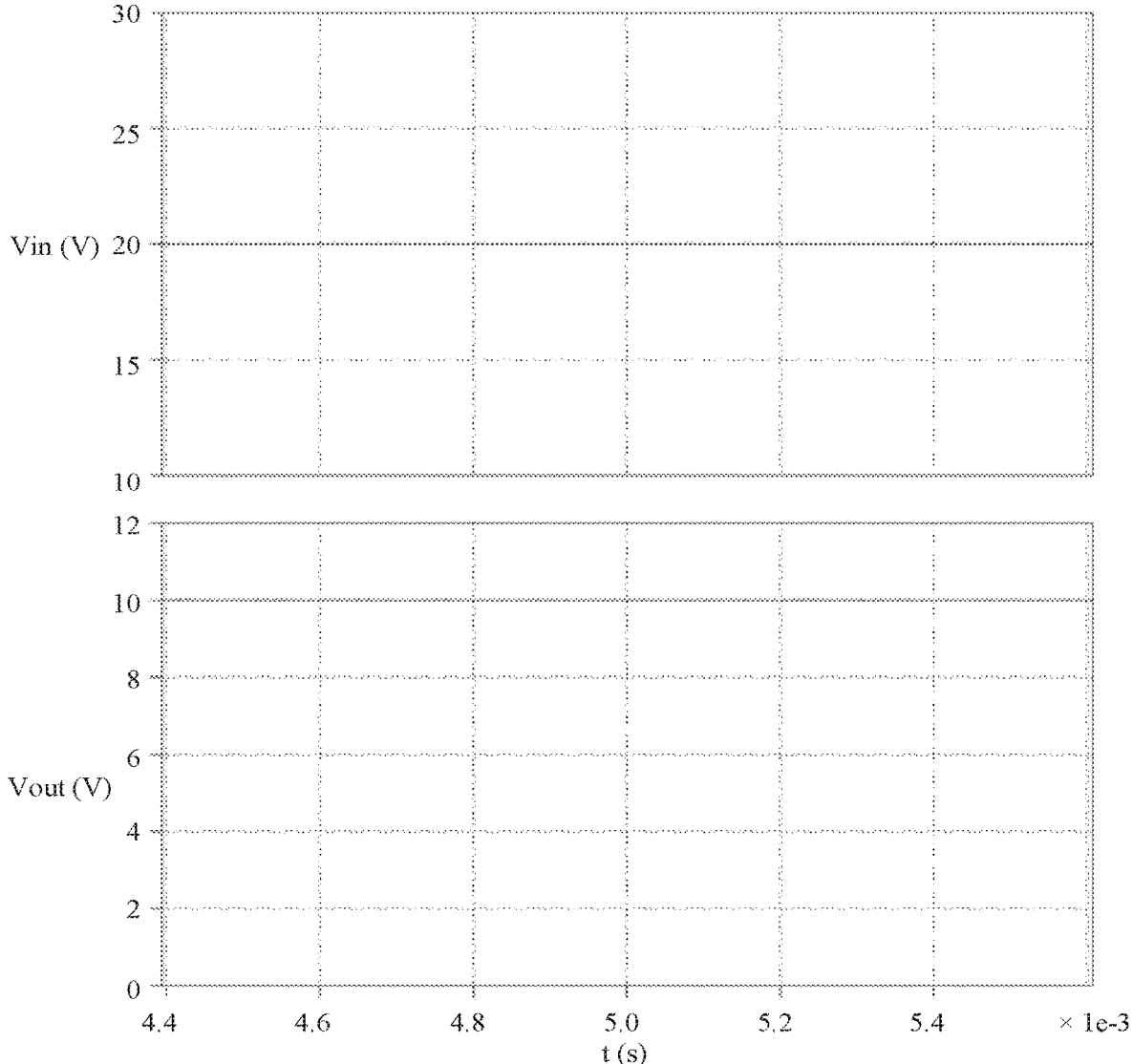
FIG. 10 is another schematic diagram of waveforms of input and output voltages of a resonant switched capacitor converter according to this application.

Further, the control module 20 may control, based on a drive signal for each of the first switch S11 to the fourth switch S41, the first switch S11 and the second switch S21 to be turned on, and control the third switch S31 and the fourth switch S41 to be turned off, or control, based on a drive signal for each switch, the first switch S11 and the second switch S21 to be turned off, and control the third switch S31 and the fourth switch S41 to be turned on. The control module 20 may control, based on a drive signal for each of the first switch S12 to the fourth switch S42, the first switch S12 and the second switch S22 to be turned on, and control the third switch S32 and the fourth switch S42 to be turned off. The control module 20 may further control, based on a drive signal for each of the first switch S13 to the fourth switch S43, each of the first switch S13 to the fourth switch S43 to be turned off. In this case, an output voltage gain of the resonant switched capacitor converter may reach 2:1. FIG. 10 is another schematic diagram of waveforms of input and output voltages of a resonant switched capacitor converter according to this application. As shown in FIG. 10, it is assumed that the input voltage Vin of the resonant switched capacitor converter is a target voltage value (for example, 20 V). When the target output voltage gain is 2:1, the control module 20 may control, based on drive signals (for example, the drive signals shown in FIG. 9) for switches in the resonant module 10a to the resonant module 10c, switches in different resonant modules to be turned on or turned off, so that an output voltage gain of the resonant switched capacitor converter reaches 2:1. In this case, the voltage ratio of the input voltage Vin of the resonant switched capacitor converter to the output voltage Vout of the resonant switched capacitor converter is 2:1. Therefore, the output voltage Vout of the resonant switched capacitor converter is 10 V (that is, 20 V/2).

In some feasible implementations, when the target output voltage gain is n:1, the control module 20 may control a first switch and a third switch in each of the Pt resonant module to an $(n-1)^{th}$ resonant module (for example, the resonant module 10a to a resonant module 10n−1) to be turned on, and control a second switch and a fourth switch in the resonant module to be turned off, or control the first switch and the third switch in the resonant module to be turned off, and control the second switch and the fourth switch in the resonant module to be turned on. In this case, resonance occurs on resonant units (for example, the resonant unit 101a to a resonant unit 101n−1) in the resonant module 10a to the resonant module 10n−1. The control module 20 may further control a first switch and a second switch in an $n^{th}$ resonant module (for example, the resonant module 10n) to be turned on, and control a third switch and a fourth switch in the $n^{th}$ resonant module to be turned off. In this case, no resonance occurs on a resonant unit (for example, the resonant unit 101n) in the resonant module 10n, so that an output voltage gain of the resonant switched capacitor converter can reach n:1.

Figure 11:
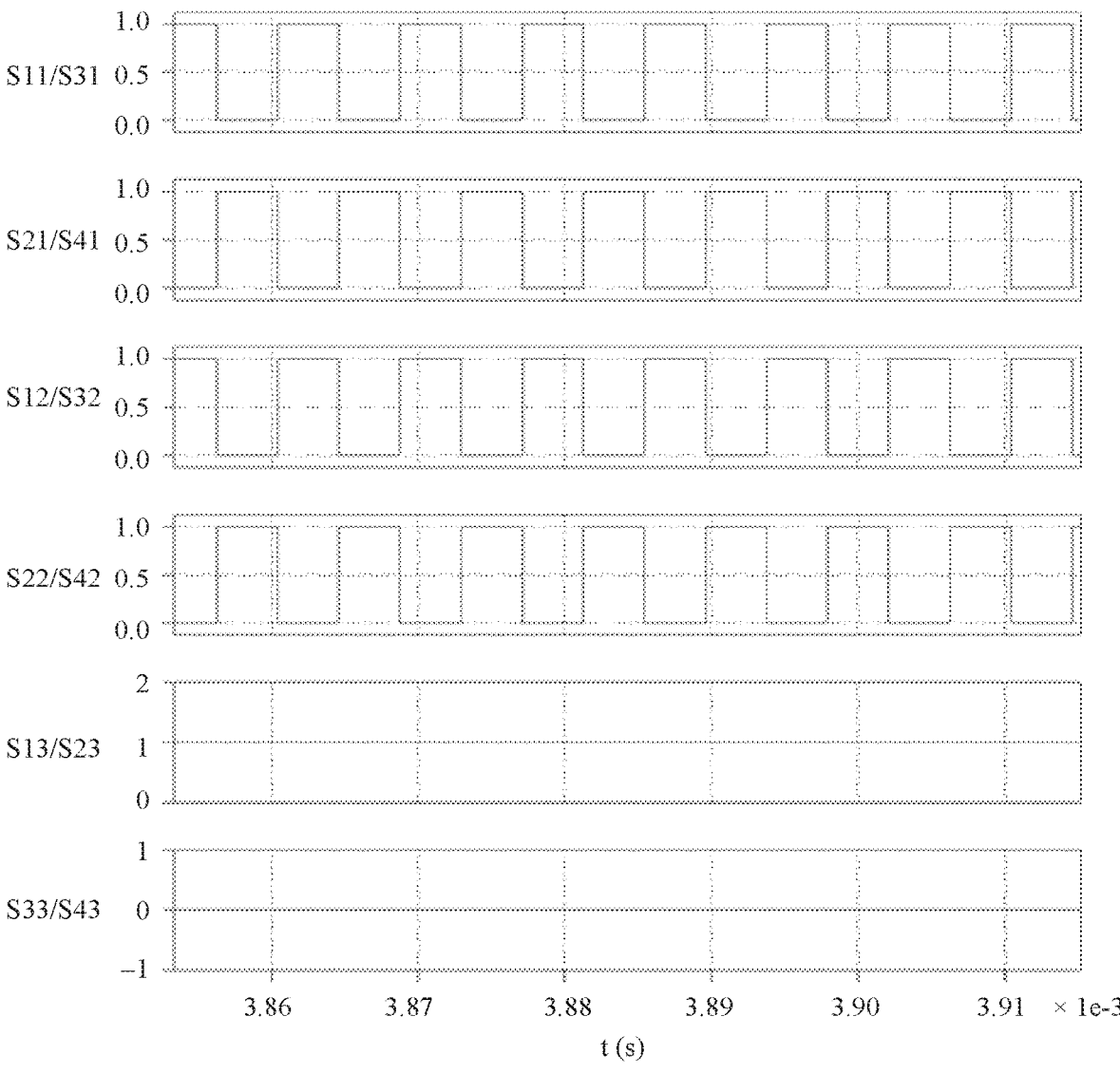
FIG. 11 is another schematic diagram of waveforms of drive signals for switches in resonant modules according to this application.

FIG. 11 is another schematic diagram of waveforms of drive signals for switches in resonant modules according to this application. For ease of description, the resonant module 10a to the resonant module 10c are used below as examples for description. As shown in FIG. 11, when the target output voltage gain is n:1 (for example, 3:1), the control module 20 may generate a drive signal for each of the first switch S11 to the fourth switch S41, the first switch S12 to the fourth switch S42, and the first switch S13 to the fourth switch S43. Drive signals for the first switch S11 and the third switch S31 are square waves with a switch duty cycle of 50%, and drive signals for the second switch S21 and the fourth switch S41 are complementary to the drive signals for the first switch S11 and the third switch S31. In other words, when the drive signals for the first switch S11 and the third switch S31 are 1 (or 0), the drive signals for the second switch S21 and the fourth switch S41 are 0 (or 1). In addition, a switching frequency of each of the first switch S11 to the fourth switch S41 is approximately a resonance frequency of the resonant module 10a. Drive signals for the first switch S12 and the third switch S32 are square waves with a switch duty cycle of 50%, and drive signals for the second switch S22 and the fourth switch S42 are complementary to the drive signals for the first switch S12 and the third switch S32. In other words, when the drive signals for the first switch S12 and the third switch S32 are 1 (or 0), the drive signals for the second switch S22 and the fourth switch S42 are 0 (or 1). In addition, a switching frequency of each of the first switch S12 to the fourth switch S42 is approximately a resonance frequency of the resonant module 10b. Drive signals for the first switch S13 and the second switch S23 are 1, drive signals for the third switch S33 and the fourth switch S43 are 0, and a switching frequency of each of the first switch S13 to the fourth switch S43 is approximately a resonance frequency of the resonant module 10c.

Figure 12:
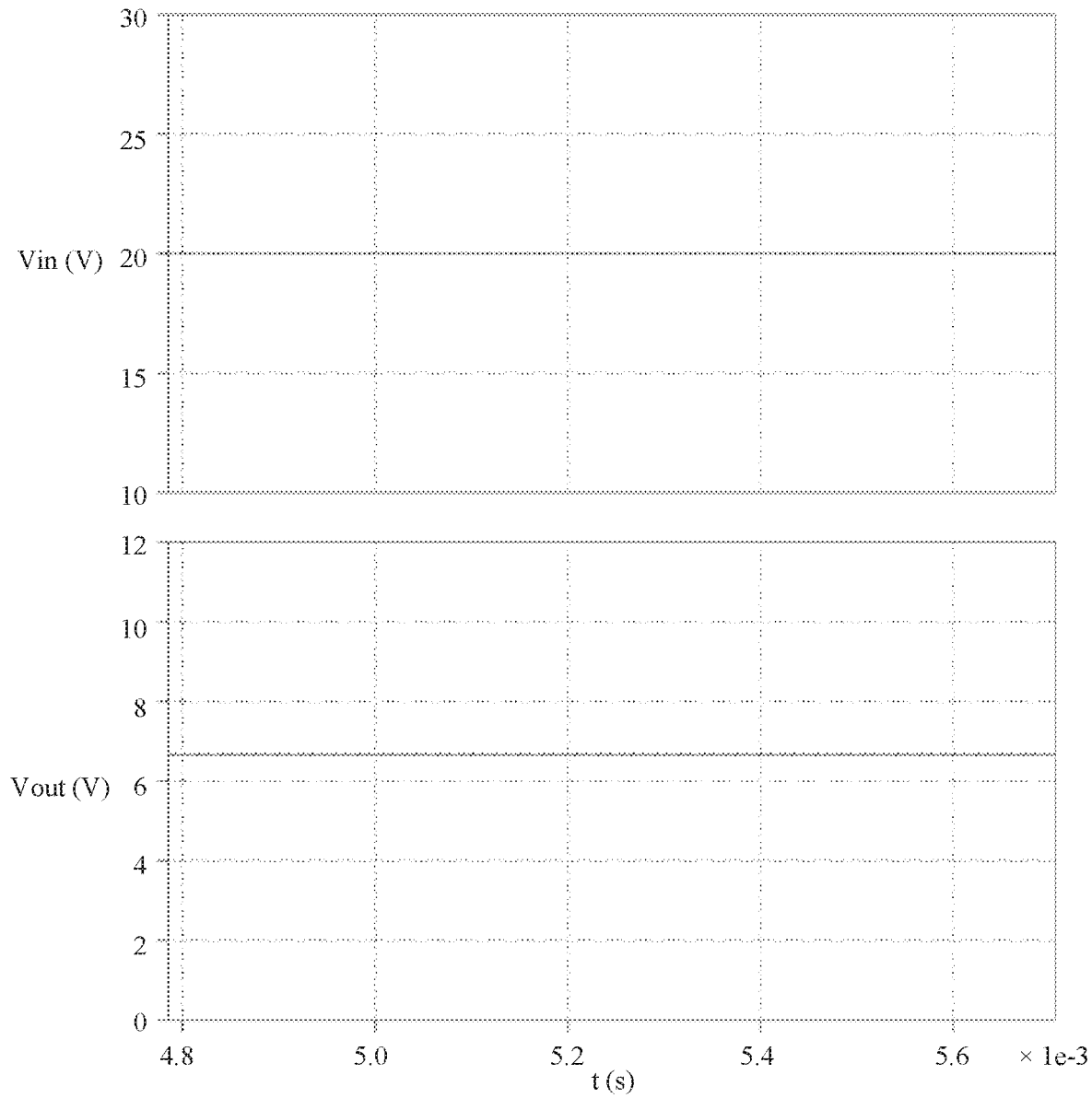
FIG. 12 is another schematic diagram of waveforms of input and output voltages of a resonant switched capacitor converter according to this application.

Further, the control module 20 may control, based on a drive signal for each of the first switch S11 to the fourth switch S41, the first switch S11 and the third switch S31 to be turned on, and control the second switch S21 and the fourth switch S41 to be turned off, or control, based on a drive signal for each switch, the first switch S11 and the third switch S31 to be turned off, and control the second switch S21 and the fourth switch S41 to be turned on. The control module 20 may control, based on a drive signal for each of the first switch S12 to the fourth switch S42, the first switch S12 and the third switch S32 to be turned on, and control the second switch S22 and the fourth switch S42 to be turned off, or control, based on a drive signal for each switch, the first switch S12 and the third switch S32 to be turned off, and control the second switch S22 and the fourth switch S42 to be turned on. The control module 20 may further control, based on a drive signal for each of the first switch S13 to the fourth switch S43, the first switch S13 and the second switch S23 to be turned on, and control the third switch S33 and the fourth switch S43 to be turned off. In this case, an output voltage gain of the resonant switched capacitor converter may reach 3:1. FIG. 12 is another schematic diagram of waveforms of input and output voltages of a resonant switched capacitor converter according to this application. As shown in FIG. 12, it is assumed that the input voltage Vin of the resonant switched capacitor converter is a target voltage value (for example, 20 V). When the target output voltage gain is 3:1, the control module 20 may control, based on drive signals (for example, the drive signals shown in FIG. 11) for switches in the resonant module 10a to the resonant module 10c, switches in different resonant modules to be turned on or turned off, so that an output voltage gain of the resonant switched capacitor converter reaches 3:1. In this case, the voltage ratio of the input voltage Vin of the resonant switched capacitor converter to the output voltage Vout of the resonant switched capacitor converter is 3:1. Therefore, the output voltage Vout of the resonant switched capacitor converter is approximately 6.6 V (that is, 20 V/3).

In some feasible implementations, when the target output voltage gain is (n+1):1, the control module 20 may control a first switch and a third switch in each of the n resonant modules (for example, the resonant module 10a to the resonant module 10n) to be turned on, and control a second switch and a fourth switch in the resonant module to be turned off, or control the first switch and the third switch in the resonant module to be turned off, and control the second switch and the fourth switch in the resonant module to be turned on. In this case, resonance occurs on resonant units (for example, the resonant unit 101a to the resonant unit 101n) in the resonant module 10a to the resonant module 10n, so that an output voltage gain of the resonant switched capacitor converter can reach (n+1):1.

Figure 13:
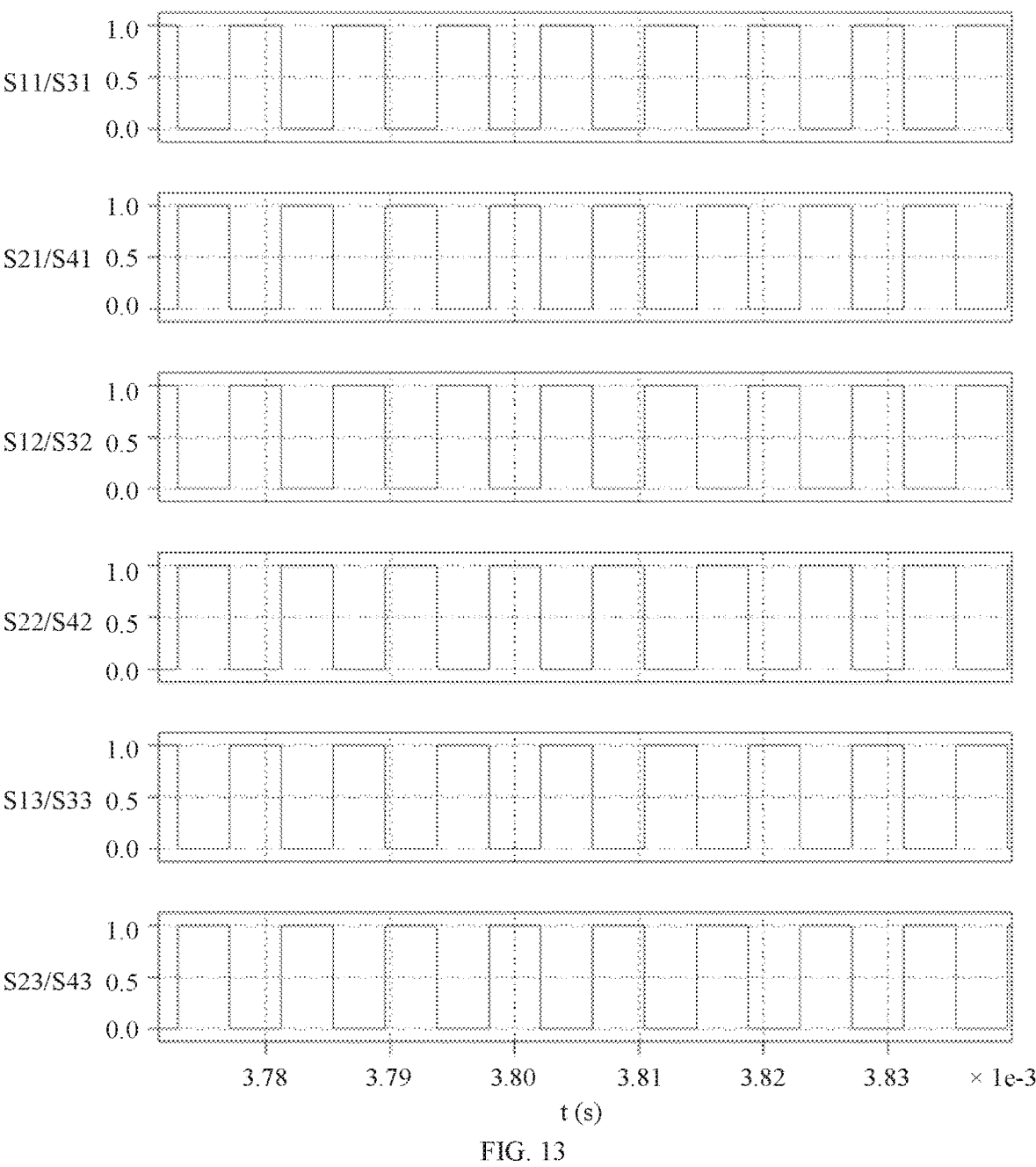
FIG. 13 is still another schematic diagram of waveforms of drive signals for switches in resonant modules according to this application.

FIG. 13 is still another schematic diagram of waveforms of drive signals for switches in resonant modules according to this application. For ease of description, the resonant module 10a to the resonant module 10c are used below as examples for description. As shown in FIG. 13, when the target output voltage gain is (n+1):1 (for example, 4:1), the control module 20 may generate a drive signal for each of the first switch S11 to the fourth switch S41, the first switch S12 to the fourth switch S42, and the first switch S13 to the fourth switch S43. Drive signals for the first switch S11 and the third switch S31 are square waves with a switch duty cycle of 50%, and drive signals for the second switch S21 and the fourth switch S41 are complementary to the drive signals for the first switch S11 and the third switch S31. In other words, when the drive signals for the first switch S11 and the third switch S31 are 1 (or 0), the drive signals for the second switch S21 and the fourth switch S41 are 0 (or 1). In addition, a switching frequency of each of the first switch S11 to the fourth switch S41 is approximately a resonance frequency of the resonant module 10a. Drive signals for the first switch S12 and the third switch S32 are square waves with a switch duty cycle of 50%, and drive signals for the second switch S22 and the fourth switch S42 are complementary to the drive signals for the first switch S12 and the third switch S32. In other words, when the drive signals for the first switch S12 and the third switch S32 are 1 (or 0), the drive signals for the second switch S22 and the fourth switch S42 are 0 (or 1). In addition, a switching frequency of each of the first switch S12 to the fourth switch S42 is approximately a resonance frequency of the resonant module 10b. Drive signals for the first switch S13 and the third switch S33 are square waves with a switch duty cycle of 50%, and drive signals for the second switch S23 and the fourth switch S43 are complementary to the drive signals for the first switch S13 and the third switch S33. In other words, when the drive signals for the first switch S13 and the third switch S33 are 1 (or 0), the drive signals for the second switch S23 and the fourth switch S43 are 0 (or 1). In addition, a switching frequency of each of the first switch S13 to the fourth switch S43 is approximately a resonance frequency of the resonant module 10c.

Figure 14:
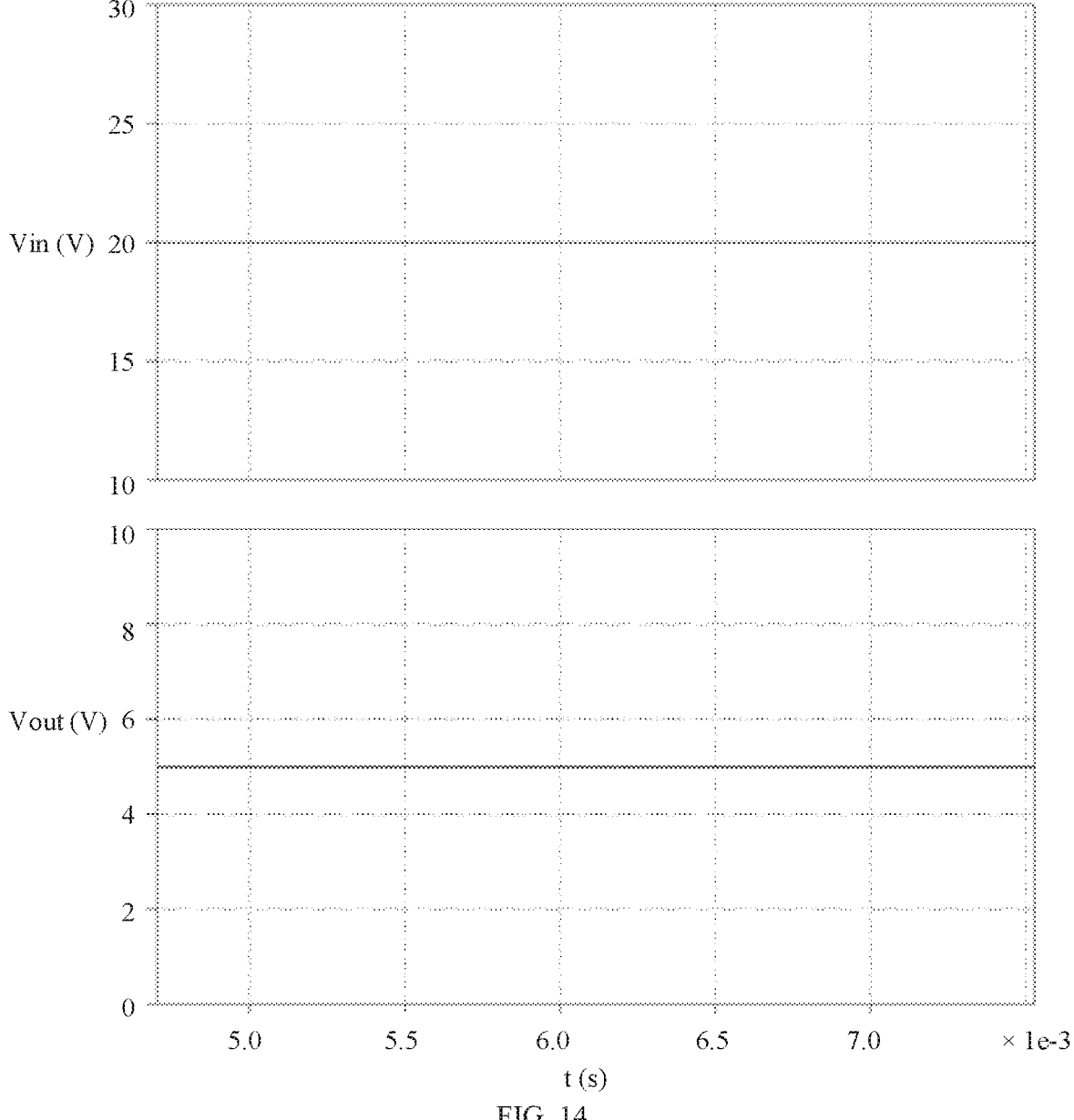
FIG. 14 is still another schematic diagram of waveforms of input and output voltages of a resonant switched capacitor converter according to this application.

Further, the control module 20 may control, based on a drive signal for each of the first switch S11 to the fourth switch S41, the first switch S11 and the third switch S31 to be turned on, and control the second switch S21 and the fourth switch S41 to be turned off, or control, based on a drive signal for each switch, the first switch S11 and the third switch S31 to be turned off, and control the second switch S21 and the fourth switch S41 to be turned on. The control module 20 may control, based on a drive signal for each of the first switch S12 to the fourth switch S42, the first switch S12 and the third switch S32 to be turned on, and control the second switch S22 and the fourth switch S42 to be turned off, or control, based on a drive signal for each switch, the first switch S12 and the third switch S32 to be turned off, and control the second switch S22 and the fourth switch S42 to be turned on. The control module 20 may further control, based on a drive signal for each of the first switch S13 to the fourth switch S43, the first switch S13 and the third switch S33 to be turned on, and control the second switch S23 and the fourth switch S43 to be turned off, or control, based on a drive signal for each switch, the first switch S13 and the third switch S33 to be turned off, and control the second switch S23 and the fourth switch S43 to be turned on. In this case, an output voltage gain of the resonant switched capacitor converter may reach 4:1. FIG. 14 is still another schematic diagram of waveforms of input and output voltages of a resonant switched capacitor converter according to this application. As shown in FIG. 14, it is assumed that the input voltage Vin of the resonant switched capacitor converter is a target voltage value (for example, 20 V). When the target output voltage gain is 4:1, the control module 20 may control, based on drive signals (for example, the drive signals shown in FIG. 13) for switches in the resonant module 10a to the resonant module 10c, switches in different resonant modules to be turned on or turned off, so that an output voltage gain of the resonant switched capacitor converter reaches 4:1. In this case, the voltage ratio of the input voltage Vin of the resonant switched capacitor converter to the output voltage Vout of the resonant switched capacitor converter is 4:1. Therefore, the output voltage Vout of the resonant switched capacitor converter is approximately 5 V (that is, 20 V/4). It can be learned that the control module 20 may generate drive signals for different switches based on different target output voltage gains, and control, based on the drive signals for the different switches, different switches in the resonant module 10a to the resonant module 10c to be turned on or turned off, so as to flexibly adjust the output voltage gain of the resonant switched capacitor converter. Therefore, applicability is higher.

In this application, each switch in each resonant module may be controlled to be turned on or turned off to flexibly adjust the target output voltage gain of the resonant switched capacitor converter. This avoids changing a hardware circuit topology. Therefore, flexibility and applicability are high.

The foregoing descriptions are implementations of the present disclosure, and are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A converter comprising:
a plurality of second capacitors coupled in series, wherein each of the second capacitors comprises:
a first end; and
a second end;
a first capacitor coupled in series to the second capacitors and comprising:
a third end; and
a fourth end;
a plurality of resonant systems, wherein each resonant system of the plurality of resonant systems corresponds to a respective one of the plurality of the second capacitors, and wherein each of the resonant systems comprises:
a resonant circuit;
a first switch system comprising:
a first connection end coupled to the first end;
a second connection end coupled to the third end; and
a third connection end; and
a second switch system comprising:
a fourth connection end coupled to the second end;
a fifth connection end coupled to the fourth end; and
a sixth connection end coupled to the third connection end through the resonant circuit; and
a control system coupled to the resonant systems and configured to:
control, based on a target output voltage gain switches in each first switch system and each second switch system to be turned on or turned off to enable the converter to obtain an output voltage gain equal to the target output voltage gain;

generate a drive signal for each switch in each resonant system based on the target output voltage gain; and control, based on at least one different target output voltage gain, switches of the resonant systems to be turned on or turned off to cause the converter to obtain an output voltage gain equal to the at least one different target output voltage gain.

2. The converter of claim 1, wherein the first switch system further comprises:

a first switch comprising:

a fifth end configured as the first connection end; and a sixth end; and a second switch coupled to the first switch in series at the third connection end and comprising:

a seventh end coupled to the sixth end; and an eighth end configured as the second connection end.

3. The converter of claim 2, wherein the second switch system further comprises:

a third switch comprising:

a ninth end configured as the fourth connection end; and a tenth end; and a fourth switch coupled to the third switch in series at the sixth connection end and comprising:

an eleventh end coupled to the tenth end; and a twelfth end configured as the fifth connection end.

4. The converter of claim 3, wherein the resonant circuit comprises:

a resonant inductor; and a resonant capacitor coupled to the resonant inductor in series, wherein a first series connection point of the resonant circuit is coupled to a second series connection point of the resonant circuit through the resonant inductor and the resonant capacitor.

5. The converter of claim 3, further comprising:

an input end; and an output end, wherein the resonant systems comprise n resonant systems, wherein n is a positive integer greater than 1, wherein the second capacitors comprise n second capacitors coupled in series between the input end and the output end, wherein the n second capacitors comprise a first second capacitor coupled to the input end and an $n^{th}$ second capacitor coupled to the output end, and wherein the n resonant systems comprise an $i^{th}$ resonant system coupled in parallel to two ends of an $i^{th}$ second capacitor of the n second capacitors.

6. The converter of claim 5, wherein the target output voltage gain is a ratio of 1:1, and wherein the control system is further configured to:

control the first switch and the second switch in a first resonant system to be turned on;

control the third switch and the fourth switch in the first resonant system to be turned off; and control each switch in each of a second resonant system to an $n^{th}$ resonant system to be turned off.

7. The converter of claim 5, wherein the target output voltage gain is a ratio of m:1, wherein m is a positive integer greater than 1 and less than n, and wherein the control system is further configured to:

control the first switch and the third switch in each of a first resonant system to an $(m-1)^{th}$ resonant system to be turned on and control the second switch and the fourth switch in each of the resonant systems to be turned off, or control the first switch and the third switch in each of the resonant systems to be turned off and control the second switch and the fourth switch in each of the resonant systems to be turned on;

control the first switch and the second switch in an $m^{th}$ resonant system to be turned on and control the third switch and the fourth switch in the $m^{th}$ resonant system to be turned off; and control each switch in each of an $(m+1)^{th}$ resonant system to an $n^{th}$ resonant system to be turned off.

8. The converter of claim 5, wherein the target output voltage gain is a ratio of n:1, and wherein the control system is further configured to:

control the first switch and the third switch in each of a first resonant system to an $(n-1)^{th}$ resonant system to be turned on and control the second switch and the fourth switch in each of the resonant systems to be turned off or control the first switch and the third switch in each of the resonant systems to be turned off and control the second switch and the fourth switch in each of the resonant systems to be turned on; and control the first switch and the second switch in an $n^{th}$ resonant system to be turned on and control the third switch and the fourth switch in the $n^{th}$ resonant system to be turned off.

9. The converter of claim 5, wherein the target output voltage gain is a ratio of (n+1):1, and wherein the control system is further configured to:

control the first switch and the third switch in each of the n resonant systems to be turned on and control the second switch and the fourth switch in each of the resonant systems to be turned off; or control the first switch and the third switch in each of the resonant systems to be turned off and control the second switch and the fourth switch in each of the resonant systems to be turned on.

10. The converter of claim 5, wherein the resonant circuit comprises:

a resonant inductor; and a resonant capacitor coupled to the resonant inductor in series, wherein a first series connection point of the resonant circuit is coupled to a second series connection point of the resonant circuit through the resonant inductor and the resonant capacitor.

11. A power supply system, comprising:

a power supply; and a resonant switched capacitor converter coupled to the power supply and comprising:

a plurality of second capacitors coupled in series, wherein one resonant system corresponds to one second capacitor, and wherein each of the second capacitors comprises:

a first end; and a second end;

a first capacitor coupled in series to the second capacitors and comprising:

a third end; and a fourth end; and a plurality of resonant systems corresponding to the second capacitors, wherein each of the resonant systems comprises:

a resonant circuit;

a first switch system comprising:

a first connection end coupled to the first end;

a second connection end coupled to the third end; and a third connection end; and a second switch system comprising:

a fourth connection end coupled to the second end;

a fifth connection end coupled to the fourth end; and a sixth connection end coupled to the third connection end through the resonant circuit; and a control system coupled to the resonant systems and configured to:

control, based on a target output voltage gain, switches in each first switch system and each second switch system to be turned on or turned off to enable the converter to obtain an output voltage gain equal to the target output voltage gain;

generate a drive signal for each switch in each resonant system based on the target output voltage gain; and control, based on at least one different target output voltage gain, switches the resonant systems to be turned on or turned off to cause the converter to obtain an output voltage gain equal to the at least one different target output voltage gain.

12. The power supply system of claim 11, wherein the power supply comprises at least one photovoltaic array comprising a plurality of photovoltaic panels coupled in series.

13. The power supply system of claim 11, wherein the power supply comprises at least one energy storage system comprising an energy storage battery or a supercapacitor.

14. The power supply system of claim 11, wherein the resonant switched capacitor converter further comprises:

a first switch comprising:

a fifth end configured as the first connection end; and a sixth end; and a second switch coupled to the first switch in series at the third connection end and comprising:

a seventh end coupled to the sixth end; and an eighth end configured as the second connection end.

15. The power supply system of claim 11, wherein the resonant circuit comprises:

a resonant inductor; and a resonant capacitor coupled to the resonant inductor in series, wherein a first series connection point of the resonant circuit is coupled to a second series connection point of the resonant circuit through the resonant inductor and the resonant capacitor.

16. The power supply system of claim 11, wherein the resonant switched capacitor converter further comprises:

an input end; and an output end, wherein the resonant systems comprise n resonant systems, wherein n is a positive integer greater than 1, wherein the second capacitors comprise n second capacitors coupled in series between the input end and the output end, wherein the n second capacitors comprise a first second capacitor coupled to the input end and an $n^{th}$ second capacitor coupled to the output end, and wherein the n resonant systems comprise an $i^{th}$ resonant system coupled in parallel to two ends of an $i^{th}$ second capacitor of the n second capacitors.

17. The power supply system of claim 11, wherein the target output voltage gain is a ratio of 1:1, and wherein the control system is further configured to:

control the first switch and the second switch in a first resonant system to be turned on;

control a third switch and a fourth switch in the first resonant system to be turned off; and control each switch in each of a second resonant system to an $n^{th}$ resonant system to be turned off.

18. The power supply system of claim 11, wherein the target output voltage gain is a ratio of m:1, wherein m is a positive integer greater than 1 and less than n, and wherein the control system is further configured to:

control the first switch and a third switch in each of a first resonant system to an $(m-1)^{th}$ resonant system to be turned on and control the second switch and a fourth switch in each of the resonant systems to be turned off or control the first switch and the third switch in each of the resonant systems to be turned off and control the second switch and the fourth switch in each of the resonant systems to be turned on;

control the first switch and the second switch in an $m^{th}$ resonant system to be turned on and control the third switch and the fourth switch in the $m^{th}$ resonant system to be turned off; and control each switch in each of an $(m+1)^{th}$ resonant system to an $n^{th}$ resonant system to be turned off.

19. The power supply system of claim 11, wherein the target output voltage gain is a ratio of n:1, and wherein the control system is further configured to:

control the first switch and a third switch in each of a first resonant system to an $(n-1)^{th}$ resonant system to be turned on and control the second switch and a fourth switch in each of the resonant systems to be turned off or control the first switch and the third switch in each of the resonant systems to be turned off and control the second switch and the fourth switch in each of the resonant systems to be turned on; and control the first switch and the second switch in an $n^{th}$ resonant system to be turned on and control the third switch and the fourth switch in the $n^{th}$ resonant system to be turned off.

20. A power supply system, comprising:

a power supply comprising at least one photovoltaic array and at least one energy storage unit; and a resonant switched capacitor converter coupled to the power supply and comprising:

a plurality of second capacitors coupled in series, wherein one resonant system corresponds to one second capacitor, and wherein each of the second capacitors comprises:

a first end; and a second end;

a first capacitor coupled in series to the second capacitors and comprising:

a third end; and a fourth end; and a plurality of resonant systems corresponding to the second capacitors, wherein each of the resonant systems comprises:

a resonant circuit;

a first switch system comprising:

a first connection end coupled to the first end;

a second connection end coupled to the third end; and a third connection end; and a second switch system comprising:

a fourth connection end coupled to the second end;

a fifth connection end coupled to the fourth end; and a sixth connection end coupled to the third connection end through the resonant circuit; and a control system coupled to the resonant systems and configured to:

control, based on a target output voltage gain, switches in each first switch system and each second switch system to be turned on or turned off to enable the converter to obtain an output voltage gain equal to the target output voltage gain;

generate a drive signal for each switch in each resonant system based on the target output voltage gain; and control, based on at least one different target output voltage gain, switches the resonant systems to be turned on or turned off to enable the converter to obtain an output voltage gain equal to the at least one different target output voltage gain.

\* \* \* \* \*